(12) United States Patent
Nizov

(10) Patent No.: US 12,110,099 B2
(45) Date of Patent: Oct. 8, 2024

(54) AEROHYDRODYNAMIC SURFACE, ARRAY OF VORTEX GENERATORS, AND METHOD OF MOUNTING ARRAY OF VORTEX GENERATORS

(71) Applicant: Sergey Nikolaevich Nizov, Orel (RU)

(72) Inventor: Sergey Nikolaevich Nizov, Orel (RU)

(*) Notice: Subject to any disclaimer, the term of this patent is extended or adjusted under 35 U.S.C. 154(b) by 132 days.

(21) Appl. No.: 17/802,591

(22) PCT Filed: Feb. 10, 2021

(86) PCT No.: PCT/RU2021/050030
§ 371 (c)(1),
(2) Date: Aug. 26, 2022

(87) PCT Pub. No.: WO2021/173039
PCT Pub. Date: Sep. 2, 2021

(65) Prior Publication Data
US 2023/0331374 A1   Oct. 19, 2023

(30) Foreign Application Priority Data
Feb. 28, 2020  (RU) .......................... RU2020108757

(51) Int. Cl.
*B64C 23/06* (2006.01)
*F15D 1/00* (2006.01)
*F15D 1/12* (2006.01)

(52) U.S. Cl.
CPC .............. *B64C 23/06* (2013.01); *F15D 1/003* (2013.01); *F15D 1/12* (2013.01); *B64C 2230/26* (2013.01)

(58) Field of Classification Search
CPC .................................................... B64C 23/06
See application file for complete search history.

(56) References Cited

U.S. PATENT DOCUMENTS 2,802,630 A * 8/1957 Birchill ................... B64C 23/06
                                                         114/274
3,578,264 A   5/1971 Kuethe
(Continued)

FOREIGN PATENT DOCUMENTS

EP   2826708 A2   1/2015
RU   2592706 C1   7/2016
(Continued)

OTHER PUBLICATIONS

Michael Shur, et al. Evaluation of Vortex Generators for Separation Control in a Transcritical Cylinder Flow. AIAA Journal vol. 53, Issue 10. Oct. 2015. Retrieved from: https://doi.org/10.2514/1.J053851 (Year: 2015).*
(Continued)

*Primary Examiner* — Joshua J Michener
*Assistant Examiner* — Michael B. Kreiner
(74) *Attorney, Agent, or Firm* — Ladas & Parry LLP

(57) ABSTRACT

This relates to the field of aerohydrodynamics and can be used on wings and control surfaces of aircraft, controlled spoilers of sports cars, all-movable masts and sails of sailing yachts and sailboards, as well as on blades and vanes of various bladed machines. An aerohydrodynamic surface includes an array of vortex generators and a main part. The main part comprises two sides mating with each other to form a leading and a trailing edges. The array of vortex generators includes elevations with crescent-shaped working edges located near the leading edge. The elevations and (Continued)

the working edges are configured to generate counter-rotating vortex structures. An array of vortex generators and a method of mounting the same onto the aerohydrodynamic surface are also described. The invention makes it possible to improve the properties of the aerohydrodynamic surfaces at high angles of attack.

20 Claims, 26 Drawing Sheets

(56) References Cited

U.S. PATENT DOCUMENTS

| | | | | |
|---|---|---|---|---|
| 5,058,837 | A * | 10/1991 | Wheeler | B64C 23/06 244/200.1 |
| 5,074,234 | A | 12/1991 | Stearns, IV | |
| 5,205,519 | A * | 4/1993 | Creel | B64C 23/06 244/200.1 |
| 5,213,287 | A * | 5/1993 | Barron | B64C 9/00 244/199.4 |
| 6,105,904 | A * | 8/2000 | Lisy | B64C 3/58 92/101 |
| 6,276,636 | B1 * | 8/2001 | Krastel | B62D 35/00 296/180.1 |
| 6,837,465 | B2 * | 1/2005 | Lisy | B64C 23/06 244/204.1 |
| 7,334,760 | B1 | 2/2008 | Lisy et al. | |
| 8,118,265 | B2 * | 2/2012 | Ferrari | B64C 3/58 244/214 |
| 8,210,482 | B2 * | 7/2012 | Miller | B64C 23/06 244/199.1 |
| 8,870,124 | B2 * | 10/2014 | Ireland | B64C 23/06 416/223 R |
| 9,476,406 | B2 * | 10/2016 | Obrecht | F03D 1/0633 |
| 11,247,769 | B2 * | 2/2022 | Hui | B64C 23/00 |
| 2008/0203233 | A1 * | 8/2008 | Schmidt | B64C 5/08 244/199.1 |
| 2009/0020652 | A1 | 1/2009 | Rincker et al. | |
| 2015/0064003 | A1 | 3/2015 | Drobietz | |
| 2017/0137116 | A1 * | 5/2017 | Ireland | B64C 23/06 |
| 2019/0210714 | A1 * | 7/2019 | Farouz-Fouquet | B64C 21/00 |

FOREIGN PATENT DOCUMENTS

| | | |
|---|---|---|
| RU | 2667410 C1 | 9/2018 |
| WO | 2015198093 A1 | 12/2015 |

OTHER PUBLICATIONS

Vortex Generators, Retrieved from the Internet:< URL: https://upload.wikimedia.org/wikipedia/commons/0/of/VortexGenerators01.JPG?157650323276>.
Fixed Slats, Retrieved from the Internet:<URL: https://i1.wp.com/forpilots.store/wp-content/uploads/2019/02/ZENITH-STOL-CH-701-PLANS-AND-INFORMATION-SET-FOR-HOMEBUILD-AIRCRAFT-2.jpg?fit=2500%2C1624&ssl=1>.
DHC-2 Beaver aircraft, Retrieved from the Internet:< URL: https://www.airlines-inform.ru/commercial-aircraft/Beaver.html>.
Vortilons, Retrieved from the Internet:< URL: https://upload.wikimedia.org/wikipedia/commons/3/3c/Raytheon_hawker_850xp_ei-kjc_arp.jpg>.
Vortex generators, Retrieved from the Internet:< URL: https://s3.amazonaws.com/assets.flitetest.com/editor_images%2F1536227702773-37136454_1536733786433198_4223283634699763712_o.jp>.
Racing yacht with an all-movable mast, Retrieved from the Internet:< URL: https://www.woodenboat.com/whiskey_plank/rotating-wing-masts%E2%80%94part-ii> (FIG 6).
Racing yacht with an all-movable mast, mast cross-section, Retrieved from the Internet:< URL: https://www.woodenboat.com/sites/default/files/whiskey-plank/sharpie-cat-42-mast-01.png> (FIG 7).
Aerohydrodynamic surface, Retrieved from the Internet:< URL: https://www.researchgate.net/figure/Sketch-of-the-OA209-Airfoil-nose-showing-Vortex-Generators-extruded-from-the-leading-edge_fig1_225021831>.
Fore-and-aft sail, Retrieved from the Internet:< URL: http://www.marinebooks.ru/7620198/22/>.
International Search Report of Application No. PCT/RU2021/050030 mailed Jun. 7, 2021.
Written Opinion of Application No. PCT/RU2021/050030 mailed Jun. 7, 2021.
A. Le Pape, etal.; "Dynamic Stall Control Using Deployable Leading-Edge Vortex Generators", US Oct. 1, 2012 (Oct. 1, 2012), vol. 50, No. 10, p. 2135-2145, Retrieved from the Internet: URL:https://arc.aiaa.org/doi/pdf/10.2514/1.J051452: XP055805732: DOI: 10.2514/1.J051452 external link ISSN:0001-1452.

* cited by examiner $a = 0.9 - 1,1b$ 38 39 5 34 40 35 41 42 43

5  6  18 44 19

45 7  5  46

AEROHYDRODYNAMIC SURFACE, ARRAY OF VORTEX GENERATORS, AND METHOD OF MOUNTING ARRAY OF VORTEX GENERATORS

RELATED APPLICATION

This application is an application under 35 U.S.C. 371 of International Application No. PCT/RU2021/050030 filed on 10 Feb. 2021, which claims priority from Russian Application No. 2020108757 filed 28 Feb. 2020 the disclosures of which are incorporated in their entirety by reference herein.

FIELD OF THE INVENTION

The invention relates to the field of aerohydrodynamics and can be used as wings, a tail assembly, ailerons of an aircraft, gliders and unmanned aerial vehicles (UAVs) for various purposes, controllable spoilers of sports cars, all-movable masts and sails of sailing yachts and sailboards, membrane wings of hang gliders, arched wings of kites, wind generator blades, propellers, blades of axial-flow compressors, fans and other bladed machines, as well as ship rudders, hydrofoils and other surfaces designed for operation in gaseous and liquid media.

BACKGROUND OF THE INVENTION

An array of vortex generators (ramp-type vortex generators) and a method of mounting the same onto an existing aerohydrodynamic surface are known, the combination of structural features of which allows considering them as the closest prior art of the proposed array of vortex generators and method of mounting the same. Photographic images of these vortex generators are posted on the Internet at the following URL:

https://upload.wikimedia.org/wikipedia/commons/0/0f/VortexGenerators01.JPG?157650 3232760

The array of vortex generators is made in the form of a set of overlays, the embodiment of which makes it possible to mount them onto the aerohydrodynamic surface comprising two sides mating with each other to form a leading and a trailing edge, and is also designed with at least one streamlined profile or in the form of a combination of profiled and membrane sections, wherein the membrane section is adjacent to the trailing edge and the profiled section is adjacent to the leading edge, each of the overlays including a base with a bearing surface as well as at least one elevation with at least one working edge.

Furthermore, the overlays are made of an aluminium T-section profile and the elevation is made in the form of a strake, the outer edge of which forms the working edge.

The method of mounting the array of vortex generators consists in placing the overlays onto the aerohydrodynamic surface near the leading edge so that the adjacent working edges are located at an angle of 20 to 60° relative to each other so as to be able to generate counter-rotating vortex structures and in attaching the overlays to the aerohydrodynamic surface using an adhesive composition.

The main advantages of this type of array of vortex generators and the method of mounting the same is the constancy of an angle of attack of the working edge of the vortex generator strake as the angle of attack of the wing increases or decreases, since the flow direction of the boundary layer does not depend on the angle of attack in the absence of a pronounced sweep along the leading edge. Furthermore, the opposite direction of rotation of adjacent vortex structures minimizes the power loss of the vortex structures due to harmful interference of the adjacent vortex structures, which significantly increases the efficiency of the vortex generators and makes it possible to partially compensate for the increase in the wing profile drag caused by the vortex generators by reducing the induced drag, since an additional suction on the upper side of the wing reduces the required angle of attack.

The main disadvantage of these vortex generators is the negative self-regulation of the vortex generation power in terms of the angle of attack, which manifests itself at subcritical angles of attack, since the vortex generators find themselves in the zone of development and partial loss of stability of the boundary layer in such flow regime, which accordingly reduces the power of the vortex structures created by the generators and accelerates the process of the boundary layer separation. At the same time, when the boundary layer separation occurs upstream of the vortex generators, their efficiency is completely cancelled and the boundary layer separation point, the forward movement of which was effectively controlled by the vortex generators up to this moment, is abruptly and suddenly moved to the leading edge, which corresponds to a curve b in FIG. 12.

Furthermore, mounting the vortex generators on the upper surface of the wing leads to a more pronounced drop in the value of the lift over drag ratio than on the "clean" wing as the angle of attack increases, which is explained by the summation of two additional rearward aerodynamic forces, which are the intrinsic drag force $X_{vg}$ of the vortex generators and the longitudinal component of the vortex increment of the total aerodynamic force $\Delta X_v$, with the intrinsic drag force X of the wing. This effect is illustrated in FIG. 9.

Moreover, the disadvantage of this type of vortex generators is their complete inefficiency at negative angles of attack.

In this regard, it seems obvious that the issue of ensuring the smooth transition of the aerodynamic surface to the stall flow regime and vice versa can be effectively solved only by transferring the boundary layer energy control means as close as possible to the leading edge of the wing.

In this context, a number of known technical solutions should be noted.

Fixed slats used, in particular, on the STOL CH 701 aircraft are widely known, the wing design of which is disclosed in a photograph posted on the Internet at https://i1.wp.com/forpilots.store/wp-content/uploads/2019/02/ZE-NITH-STOL-CI-701-PLANS-AND-INFORMATION-SET-FOR-HOMEBIUILD-AIRC:RAFT-2.jpg?fit=2500%2C16 24&ss1=1

The main advantage of the fixed slats is a considerable, up to 10-12°, increase in $a_{crit}$ in terms of Cy, which is achieved due to the fact that the increase in the boundary layer energy occurs uniformly over the entire span of the slat and also affects the ascending part of the upper arch of the aerofoil section. In turn, the presence of an angle-of-attack margin provides the possibility of safe take-off and landing onto short unprepared sites, the possibility of stable parachuting at minimum speeds and the absence of the possibility of entering a spin. The main disadvantage of this technical solution is the increased profile drag arising, among other things, due to the base drag of the fixed slat, the base drag caused by the considerable suction on its rear side at low angles of attack. For the same reason, the fixed slats significantly reduce the lift over drag ratio of the aircraft, bringing it closer to the performance of gyroplanes and light helicopters in the autorotation regime. Furthermore, due to the extremely small critical value of alpha at negative angles of attack, the fixed slats are undesirable to use on aircrafts with a lower wing location, since aircrafts with a fixed slat, as a rule, are not pulled out of an inverted flat spin, the probability of entering which increases with the lower wing location.

Aerodynamic baffles covering a leading edge of a wing and mounted on an outer part of wing consoles opposite to ailerons are known. Such aerodynamic baffles are mounted, for example, on the DHC-2 Beaver aircraft, a photograph of which is posted on the Internet at https://www.airlines-inform.ru/commercial-aircraft/Beaver.html.

The advantage of these baffles is the improvement of the directional stability of an aircraft and the difficulty of accidentally entering a spin from a turning flight due to the limitation of the boundary layer flow directed along the wing span towards the tip on the retreating wing console as well as due to the generation of vortex structures being adjacent to the upper and lower sides of the wing in the presence of a considerable sideslip angle. The disadvantage of this technical solution is the limited aerodynamic efficiency, including the impossibility of increasing the critical angle of attack as well as the slight increase in the profile drag.

Vortilons are also known, a photograph of an aircraft wing with which is available on the Internet at the following URL: https://upload.wikimedia.org/wikipedia/commons/3/3c/Raytheon_hawker_850xp_ei-kjc_arp.jpg.

The vortilons are vortex generators made in the form of pylons being small in size and protruding beyond the front and lower dimensions of the aerofoil section. The main advantage of the vortilons is a pronounced positive self-regulation of the vortex generation power in terms of the angle of attack as well as an insignificant additional profile drag at low angles of attack (self-shutdown effect), which makes them an effective measure in the fight against the tip stall on a swept wing and allows them to be used on high-speed aircrafts, for example, on SAAB J-35 Draken.

The disadvantage of the vortilons is the obvious dependence of their aerodynamic efficiency on the sweep angle of the leading edge of the wing, since the presence of a pronounced flow downwash in the leading-edge zone is required for the normal operation of the vortilons. This considerably narrows the field of application of the vortilons.

Vortex generators are also known, which have been used since 2015 on radio-controlled aircraft models manufactured by the American company "Flex Innovations", a photograph of which is available on the Internet at https://s3.amazonaws.com/assets.flitetest.com/editor_images%2F1536227702773-37136454_1536733786433198_4223283634699763712_o.jpg These vortex generators are designed in the form of small triangular teeth made of a polymer sheet material. The teeth are grouped into an array of 12 to 20 pieces on the aircraft wing and are mounted on the leading edge in the wing tips, wherein the array of vortex generators occupies about a quarter of the length of the leading edge of each of the consoles.

The advantage of this technical solution is the improvement of roll damping in combination with a smoother stall of the wing with a loss of speed, and at the same time these improvements are expressed both at positive and negative angles of attack, which considerably simplifies the performance of manoeuvres of the so-called 3D aerobatics.

The disadvantage of this type of vortex generators is a rapid increase in the profile drag and a drop in the lift over drag ratio with an increase in the angle of attack, which occurs due to a significant increase in pressure under a tooth. Furthermore, the angle of attack of the working edge of the vortex generator, the plane of which is oriented across the flow direction, grows somewhat faster than the angle of attack of the wing as the angle of attack of the wing increases, which reduces the efficiency of the vortex generator and the boundary layer energy at high angles of attack.

An aerohydrodynamic surface is also known, the description of which is posted on the Internet at https://www.researchgate.net/figure/Sketch-of-the-OA209-Aerofoil-nose-showing-Vortex-Generators-extruded-from-the-leading-edge_fig1_225021831 and which is closest to the proposed aerohydrodynamic surface by its technical solution. This aerohydrodynamic surface includes an array of vortex generators and a main part, wherein the main part comprises two sides mating with each other to form a leading and a trailing edge and is also formed longitudinally by at least one streamlined profile at least in the front part, the array of vortex generators includes elevations with crescent-shaped working edges located near the leading edge so as to be fully or partially located in the flow stagnation zone at a given angle of attack and to exit from the flow stagnation zone when the angle of attack is changed relative to the given one, and the frontal projections of the working edges are fully or partially located at an angle of 60 to 80° to the frontal projection of the leading edge and intersect the frontal projection of the leading edge so as to be able to generate bounded vortex structures and to increase the boundary layer energy on one of the sides of the aerohydrodynamic surface.

Furthermore, this publication also contains information about an aerohydrodynamic surface which is designed with slots in the leading edge, wherein the vortex generators are made in the form of plates and are mounted in the slots of the aerohydrodynamic surface, and the plate parts protruding beyond the dimensions of the streamlined profile form strakes.

Moreover, the strakes are mounted in the slots so as to be able to extend and retract flush with the streamlined profile in order to reduce the parasitic vortex generation at low angles of attack.

The main advantage of the aerohydrodynamic surface with the array of vortex generators located directly on the leading edge is the positive self-regulation of the vortex generation power in terms of the angle of attack in a wider range, since, on the one hand, a part of the length of the working edges is located in the flow stagnation zone with relatively small strake sizes at low angles of attack, which minimizes losses due to the parasitic vortex regeneration and reduces the profile drag. On the other hand, when reaching high angles of attack, the flow separation point moves from the leading edge to the lower side. At the same time, the flow direction in the boundary layer near the leading edge becomes unidirectional, which leads to the involvement of the entire length of the working edges in the vortex generation process and, accordingly, increases the vortex generation power to a maximum even before the aerohydrodynamic surface reaches the supercritical angle of attack, which potentially significantly improves the stall characteristics of the aerodynamic surface.

The disadvantage of this technical solution is the limited aerodynamic efficiency, partly caused by the fact that all the aerodynamic strakes are characterized by the clearly excessive coverage of the leading edge and are also mounted too close to each other and with an inclination to one side in the investigated mathematical model of the aerohydrodynamic surface, which in turn causes a pronounced harmful interference of the vortex structures generated by adjacent working edges and leads to a rapid drop in the energy of the boundary layer as it moves towards the trailing edge.

A wing with vortex generators on the leading edge is also known, the wing described in the application US2009/0020652. This technical solution is an aerodynamic surface comprising an array of vortex generators mounted on the upper surface of the wing near the leading edge and made in the form of triangular elevations, the width of which decreases and the height increases with distance from the leading edge.

Furthermore, this array of vortex generators is mounted on a deice boot made of an elastic material with pneumatic chambers inside.

The disadvantage of this aerodynamic surface is the unevenness of the increase in the boundary layer energy along the chord and span of the aerodynamic surface, which is expressed in the formation of local zones of the boundary layer separation near the leading edge, since the triangular elevations can not be located close enough to each other to maintain sufficient boundary layer energy near the leading edge over the entire span of the aerodynamic surface.

A classical fore-and-aft sail is also known, the sail comprising a gore mounted on a mast or a stay and controlled by changing the sheet length. A description of the operation of the fore-and-aft sail is available on the Internet at http://www.marinebooks.ru/7620198/22/

The main disadvantage of the classical fore-and-aft sail, which is a special case of a membrane aerodynamic surface, is a small range of angles of attack, at which an uninterrupted flow around the leeward side of the sail is ensured. Thus, the generation of vortex flows (vortex bubbles) begins on the leeward side of the sail near its leading edge (leech) at angles of attack of more than 5-7°, characterized by a reverse flow direction in the boundary layer, which significantly reduces the thrust force of the sail and, as a consequence, the sailing rate of a ship. When the ship further falls off to leeward or the length of the sheet is shortened at angles of attack exceeding 10-12°, the entire leeward side of the sail is in the stall flow zone, which is expressed in the form of shivering the sail. This disadvantage of the fore-and-aft sail is especially deeply felt while sailing free in relatively weak winds and light triangular sails with a double positive curvature, which are spinnakers and gennakers, are used to compensate for the loss of thrust of the fore-and-aft sail under these conditions.

Vortex generators for sails are also known, the generators described in the patent document U.S. Pat. No. 5,074,234. These vortex generators are protrusions made of an elastic material and placed on both sides of the sail cloth so as to be able to increase the boundary layer energy on the leeward side of the sail.

The advantage of this technical solution is an increase in the "elasticity" of the sail along the off-bow angle, that is, an improvement in its thrust characteristics while sailing free by delaying the stall on the leeward side of the sail.

The disadvantage of this technical solution is the limited aerodynamic efficiency caused by the parasitic vortex generation produced by the vortex generators located on the windward side, wherein the location of the vortex generators on both sides of the sail is required under the condition of the possibility of sailing on both tacks without changing sails.

A rig of a racing yacht with an all-movable mast is also known, a drawing of which is available on the Internet at the following URL: https://www.woodenboat.com/whiskey-_plank/rotating-wing-masts%E2%80%94part-ii, with an image of the cross-section of the mast being shown in the following photo: https://www.woodenboat.com/sites/default/files/whiskey-plank/sharpie-cat-42-mnast-1.mg This rig, in particular, comprises profiled and membrane sections that develop into each other, wherein the profiled section is designed in the form of an all-movable mast made with a symmetrical aerofoil section and the membrane section is designed in the form of a sail mounted on the trailing edge of the profiled section.

The advantage of this technical solution is good windward thrust characteristics due to the high lift over drag ratio of the "mast-sail" system and the disadvantage is the premature loss of thrust while sailing free due to the flow stall on the leeward side of the sail.

An antitorque rotor of a single-rotor helicopter is also known, the rotor comprising blades mounted on the hub using torsion hinges so as to be able to change the angle of pitch of the blades in order to compensate for the reactive moment of the main rotor and to implement the control of the helicopter in the directional axis.

The disadvantage of this technical solution is the probability of development of a flow stall on the antitorque rotor blades, which leads to uncontrolled rotation of the helicopter around the vertical axis in some cases. The flow stall on the antitorque rotor blades has much in common with the tip stall of an aircraft in a turn, since the retarded part of the aerodynamic surface is subjected to the stall in both cases: in the case of the antitorque rotor of the helicopter, this is the blade root rotating at a lower peripheral speed, and in the case of the aircraft wing, this is the retarded wing console located closer to the centre of the aircraft turn relative to the vertical axis.

A hydrodynamic surface designed in the form of a rudder blade of a balanced or semi-balanced type is also known, the rudder blade being made with a symmetrical streamlined profile.

The main disadvantage of the classical rudder blade when being used on a sailing vessel is a drop in the efficiency of steering at a low sailing rate of the vessel caused, among other things, by the lack of an angle-of-attack margin determining the maximum angle of effective rudder displacement, which considerably worsens the turning qualities of the vessel at low speed and can be critical when passing buoys in "calm" sailing races and when mooring. A streamlined profile is used as a way to increase the effective angle of rudder displacement, the profile being close to the symmetrical aerofoils used in aerobatic aircrafts.

A shipboard steering device described in the patent document RU 2592706 is also known. This device is a rudder blade divided into bow, main and stern parts pivotally connected to each other so as to be able to curve the hydrodynamic profile of the rudder blade and to improve the maneuvering characteristics of the vessel, wherein the bow and stern parts of the rudder blade function as a droop nose and a flap of an aircraft wing.

The disadvantage of this steering device is the increased structural complexity and manufacturing cost.

Thus, when developing the proposed group of inventions, the primary objective was to significantly improve the lifting characteristics of aerodynamic and hydrodynamic surfaces at subcritical angles of attack by increasing the critical angle of attack in terms of Cy as well as to ensure that the growth of Cx lags behind the growth of Cy and the movement of the boundary layer separation point to the leading edge slows down as it approaches the critical angle of attack in terms of Cy with an insignificant increase in Cx at low and near-zero angles of attack.

Furthermore, as applied to aircrafts and gliders, the objective was to improve stability and controllability characteristics at subcritical and supercritical angles of attack, including the exclusion of deliberately or accidentally entering a spin or the utmost simplification of pulling out of a spin.

In addition, with respect to aircrafts and gliders as well as UAVs for various purposes, the objective of wide-range regulation of the characteristics of lateral-directional stability and controllability by varying the number and size of vortex generators was set.

Furthermore, as applied to variable-pitch propellers, the objective to increase the stall margin in the propeller root was set, in particular, to minimize the probability of the occurrence of the vortex-ring state of the helicopter antitorque rotor.

In addition, with respect to the controllable spoilers of sports cars, the objective to provide the possibility of expanding the range of angles of pitch of the spoiler was set, at which range there is an increase in the downforce of the spoiler.

Moreover, as applied to sailing yachts, sailboards and guided kites, the objective was to improve the thrust of the rig at high angles of attack corresponding to sailing free or weak gusty winds.

In addition, with respect to the steering of sailing yachts, the objective was to improve the turning qualities of the vessel at low speed by increasing the effective angle of rudder displacement.

Furthermore, as applied to wind generators, the objective was to improve the response of the wind generator rotor to weak gusty winds and to increase the energy efficiency of the plant.

Moreover, with respect to axial-flow compressors and other bladed machines, the objective to increase the resistance to stalling and surging was set.

The object of the invention is to comprehensively improve the characteristics of aerohydrodynamic surfaces for various purposes.

The stated problem is solved in the known aerohydrodynamic surface, which includes an array of vortex generators and a main part, wherein the main part comprises two sides mating with each other to form a leading and a trailing edge and is also formed longitudinally by at least one streamlined profile at least in the front part, the array of vortex generators includes elevations with crescent-shaped working edges located near the leading edge so as to be fully or partially located in the flow stagnation zone at a given angle of attack and to exit from the flow stagnation zone when the angle of attack is changed relative to the given one, and the frontal projections of the working edges are fully or partially located at an angle of 60 to 80° to the frontal projection of the leading edge and intersect the frontal projection of the leading edge so as to be able to generate bound vortex structures and to increase the boundary layer energy on one of the sides of the aerohydrodynamic surface.

According to the invention, the elevations and the working edges are configured to generate counter-rotating vortex structures, wherein the ratio of the distance between the midpoints of the frontal projections to the height of the frontal projections is from 0.5 to 1.5 and the tangents to the midpoints of the frontal projections are located at an angle of 20 to 60° to each other for two working edges configured to generate counter-rotating vortex structures.

The elevations can be made in the form of strakes of a flat or triangular cross-section enveloping the leading edge and having a crescent shape, wherein the working edges are formed by the outer edges of the strakes.

Furthermore, the elevations can be made in the form of a group of protrusions, wherein the projection of the leading edge of the aerohydrodynamic surface onto the plane of the chords is crank-shaped, the frontal projections of the protrusions have a trapezoidal shape, each of the protrusions is formed by a front and two side surfaces, and the working edges of the protrusion are formed by mating the front surface with the side surfaces of the protrusions and are configured to generate counter-rotating vortex structures.

The elevations can also be made in the form of conjunctions of saddle-shaped surfaces mating with each other and smoothly developing to both sides of the aerohydrodynamic surface, wherein the saddle-shaped surfaces have a negative curvature, the edges of the saddle-shaped surface at the sites of mating with the adjacent saddle-shaped surfaces form working edges configured to generate counter-rotating vortex structures and the projection of the leading edge onto the plane of the chords is a combination of arcs of a constant or variable radius that are mating with each other.

The aerohydrodynamic surface can be designed with an asymmetrical streamlined profile, wherein the elevations are made in the form of combinations of saddle-shaped surfaces of a negative curvature or ledges with strakes, wherein the strakes are mounted on the side of the aerohydrodynamic surface having a larger curvature and smoothly mate with the ledges or conjunctions of the saddle-shaped surfaces of the negative curvature, and the working edges smoothly develop from the ledges or conjunctions of concave surfaces of a negative curvature to the strakes.

The working edges can be additionally bent so that their frontal projections are S-shaped, wherein the tangents to the ends of the frontal projections of the adjacent working edges are located at an angle of no more than 10° to each other so as to be able to reduce the power of the parasitic vortex generation.

Furthermore, the aerohydrodynamic surface can be fully or partially designed with a symmetrical streamlined profile, wherein the lateral projections of the working edges are symmetrical relative to the midline of the streamlined profile, and two adjacent distances between the points of intersection of the frontal projections of the adjacent working edges with the frontal projection of the leading edge differ from each other by no more than 10% so as to be able to equalize the characteristics of the aerohydrodynamic surface at positive and negative angles of attack.

Preferably, the array of vortex generators includes elevations that form the working edges of at least two standard sizes, the working edges are arranged in pairs, each of the pairs of working edges is configured to generate counter-rotating vortex structures, and at least one pair of working edges of a larger standard size that is configured to equalize the boundary layer energy along the chord and span of one of the sides of the aerohydrodynamic surface is located between two pairs of working edges of a smaller standard size.

In this case, the aerohydrodynamic surface can be formed longitudinally by at least one asymmetrical streamlined profile, the frontal projections of the working edges of the larger and smaller standard sizes are offset relative to each other, and the midpoints of the frontal projections of the working edges of the strakes of the larger standard size are offset in the bending direction of the midline of the streamlined profile relative to the midpoints of the frontal projections of the working edges of the smaller standard size.

The aerohydrodynamic surface may further comprise a leading-edge skin and a core, and the array of vortex generators is made in the form of plates with holes, the leading-edge skin is made of a sheet material, the core is made of a foamed polymer material and is glued to the skin with an adhesive composition, the leading-edge skin and the core are designed with slots, wherein the slots of the core are in communication with the slots of the leading-edge skin, and the plates are mounted in the slots and fixed with the adhesive composition, wherein the outer parts of the plates protruding beyond the dimensions of the leading-edge skin form strakes, and the holes of the plates are configured to be filled with the adhesive composition.

Furthermore, the aerohydrodynamic surface may further comprise a two-layer leading-edge skin consisting of an outer and an inner layer, wherein the outer layer is made with a group of cut-outs, the array of vortex generators is made in the form of a set of overlays, each overlay includes a base developing into one or two strakes, the bases of the overlays enter the cut-outs of the outer layer so as to be able to reduce the aerodynamic resistance, and the thickness of the outer layer is greater than or equal to the thickness of the bases of the overlays.

Moreover, the aerohydrodynamic surface can be formed longitudinally by a combination of profiled and membrane sections, wherein the profiled section is made in the form of an all-movable mast and the membrane section is made in the form of a fore-and-aft sail mounted on the trailing edge of the all-movable mast, wherein the aerohydrodynamic surface is configured to turn the profiled section relative to the chord when the membrane section is bent under the action of a wind force.

Furthermore, the stated problem is solved in the array of vortex generators designed for mounting onto the aerohydrodynamic surface described above and made in the form of a set of overlays, the embodiment of which makes it possible to mount them onto the aerohydrodynamic surface comprising two sides mating with each other to form a leading and a trailing edge, and also designed with at least one streamlined profile or in the form of a combination of profiled and membrane sections, with the membrane section being adjacent to the trailing edge and the profiled section being adjacent to the leading edge, each of the overlays including a base with a bearing surface as well as at least one elevation with at least one working edge, and differing from the known array of vortex generators in that the minimum radius of curvature of the bearing surface of the overlay is from 90 to 110% of the minimum radius of bluntness of the leading edge of the aerohydrodynamic surface, wherein the embodiment of the overlays and the method of mounting them ensure the formation of the proposed aerohydrodynamic surface according to Claim 1 when mounting the set of overlays onto the aerohydrodynamic surface.

In addition, each of the overlays is designed with one strake developing into the base, wherein the array of vortex generators comprises two types of overlays, the bases of the overlays are made with clockwise or counterclockwise twisting, and the two types of overlays are characterized by the opposite twisting direction of the bearing surface.

Furthermore, each of the overlays is made with two strakes mounted on the base, wherein the base is made with a narrowing in the middle part, and the outer edges of the strakes form paired working edges.

Moreover, each of the overlays is made in the form of a base having a trapezoidal shape and configured to form elevations in the form of ledges formed by a front, two side and a bearing surface, wherein the paired working edges are formed by mating the front and side surfaces of the base.

In addition, the front surface of the base includes a saddle-shaped surface of a negative curvature that is adjacent to the working edges.

Furthermore, each of the overlays is made in the form of a shoe including at least two pairs of working edges.

In addition, each of the overlays is designed with at least one transverse slot configured to improve the fit of the overlay to the existing aerohydrodynamic surface.

Moreover, the proposed group of inventions also includes a Method of mounting the proposed array of vortex generators made in the form of a set of overlays onto an existing aerohydrodynamic surface, the method consisting in placing the overlays onto the aerohydrodynamic surface near the leading edge in such a way that adjacent working edges are located at an angle of 20 to 60 degrees relative to each other so as to be able to generate counter-rotating vortex structures and in attaching the overlays to the aerohydrodynamic surface using an adhesive composition and differing from the known method in that the overlays are mounted in such a way that the frontal projections of the working edges of the overlays intersect the frontal projection of the leading edge of the existing aerohydrodynamic surface, wherein the ratio of the distance between the midpoints of the frontal projections to the height of the frontal projections is about 0.5 to 1.5 for two working edges configured to generate counter-rotating vortex structures.

Thus, owing to the introduction of new design features into the known technical solutions, the characteristics of aerohydrodynamic surfaces for various purposes at high angles of attack are improved, while the existing aerohydrodynamic surfaces are easily and inexpensively modified to the properties of the proposed aerohydrodynamic surface.

The invention is illustrated by drawings.

Figure 1:
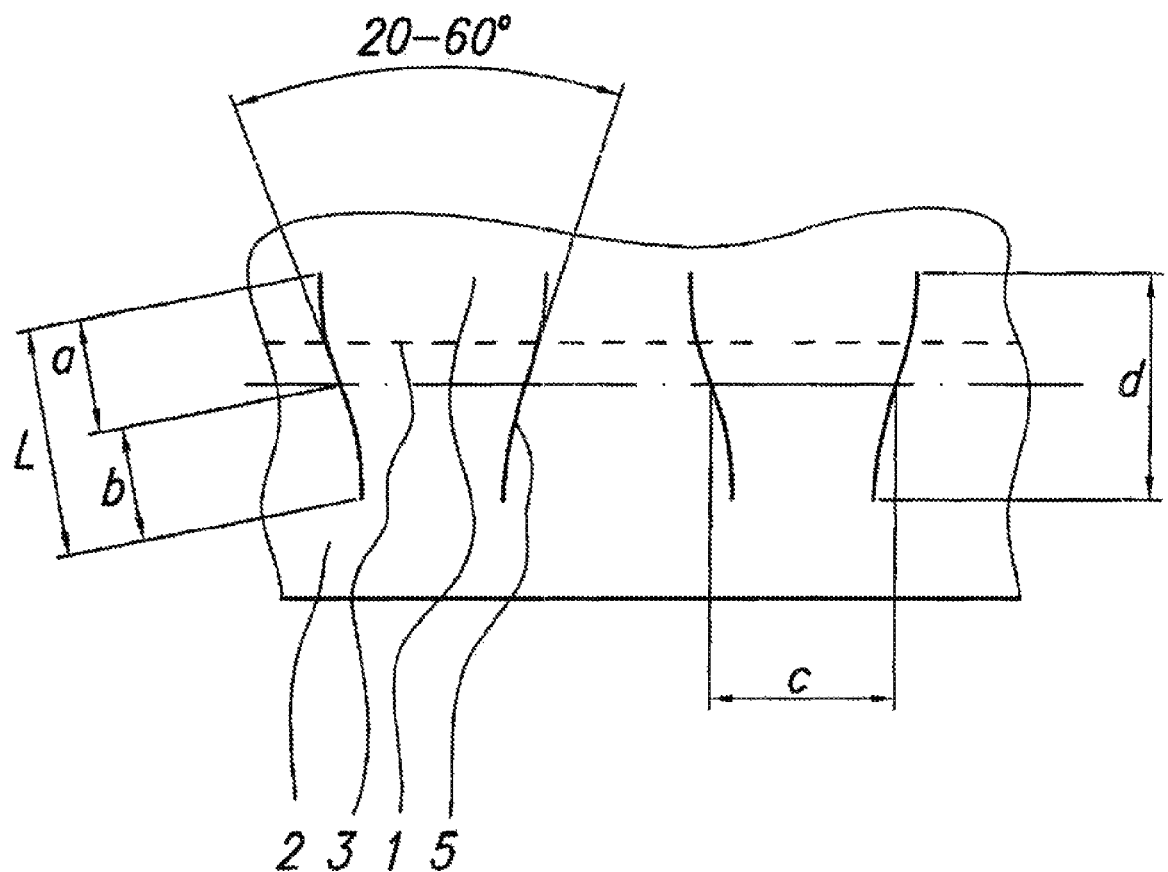
FIG. 1 shows an aerohydrodynamic surface with a array of vortex generators according to the invention, front view.
Figure 25:
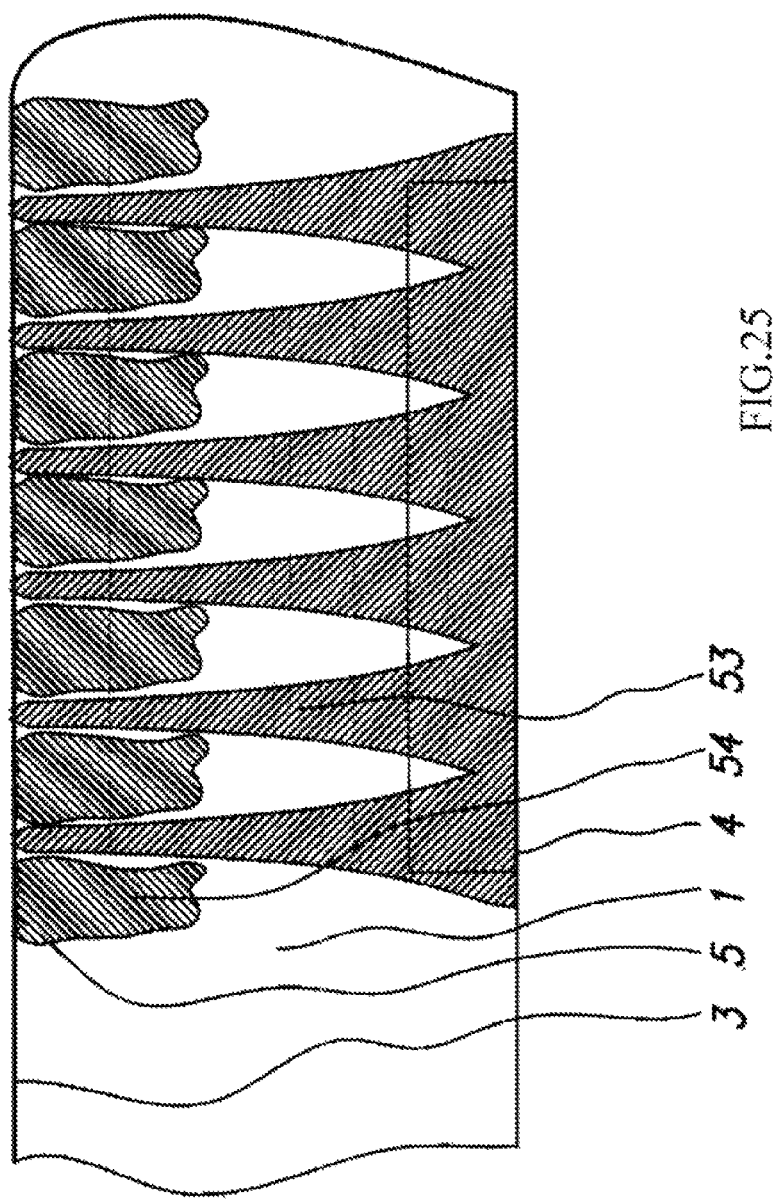
FIG. 25 is a diagram of distribution of increasing energy zones of the boundary layer with the array of vortex generators according to FIG. 23.

As it is shown in FIG. 1, the aerohydrodynamic surface comprises a main part including an upper side 1 and a lower side 2 mating with each other to form a leading edge 3 and a trailing edge 4 (FIG. 25). The aerohydrodynamic surface is formed longitudinally by at least one streamlined profile at least in the front part. The aerohydrodynamic surface further comprises a array of vortex generators, which includes three or more pairs of working edges 5, wherein the tangents to the midpoints of the frontal projections of the paired working edges 5 are located at an angle of 20 to 60° to each other. The ratio of the distance "C" between the midpoints of the frontal projections of the paired working edges to the height of the frontal projections of the paired working edges "d" is from 0.5 to 1.5, and the ratio of the distance between the midpoints of the frontal projections of the nearest unpaired working edges "e" to the distance between the midpoints of the frontal projections of the paired working edges "c" is from 1 to 4. The working edges are formed by elevations of the aerohydrodynamic surface, which can be implemented in different ways depending on the purpose and dimensions of the aerohydrodynamic surface.

Figure 2:
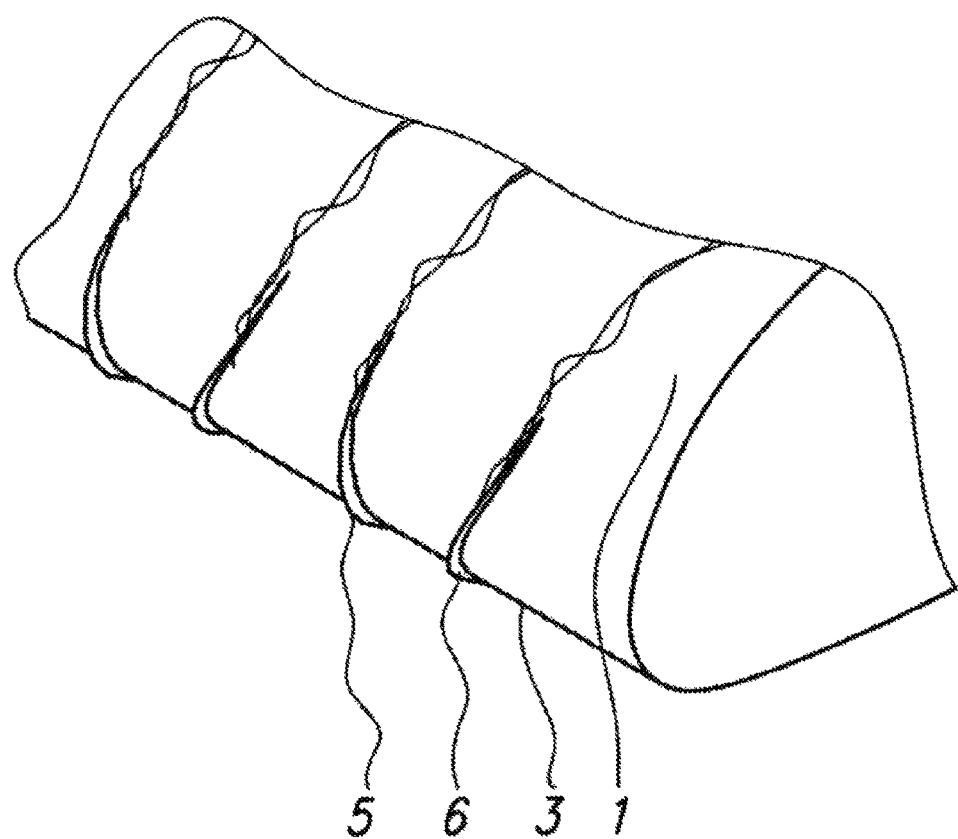
FIG. 2 represents an overall view of the front part of the aerodynamic surface with elevations in their first embodiment.

Thus, as it is shown in FIG. 2, the elevations can be made in the form of strakes 6 of a flat or triangular cross-section, the strakes enveloping the leading edge 3 and having a crescent shape, wherein the working edges 5 are formed by the outer edges of the strakes (6).

Figure 3:
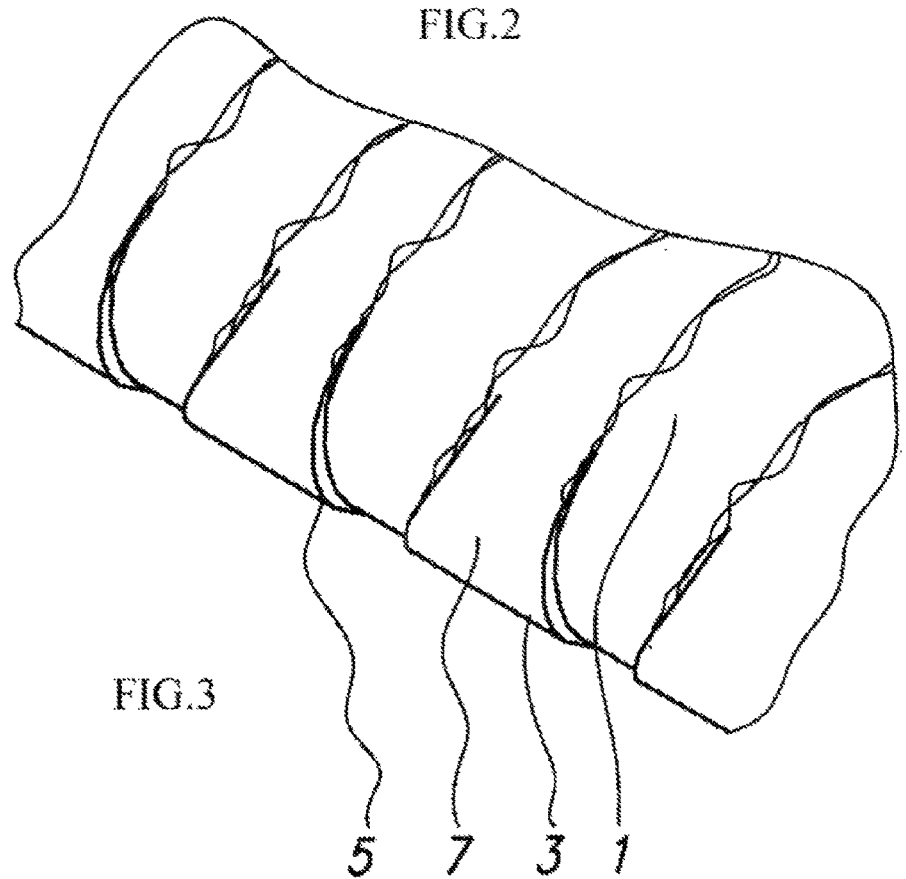
FIG. 3 is an overall view of the front part of the aerodynamic surface with the elevations in their second embodiment.

As it is shown in FIG. 3, the elevations can be made in the form of a group of protrusions 7, wherein the projection of the leading edge 3 of the aerohydrodynamic surface onto the plane of the chords is crank-shaped. The frontal projections of the protrusions 7 have a trapezoidal shape, with each of the protrusions 7 being formed by a front and two side surfaces and the working edges 5 being formed by mating the front and side surfaces of the protrusions 7.

Figure 4:
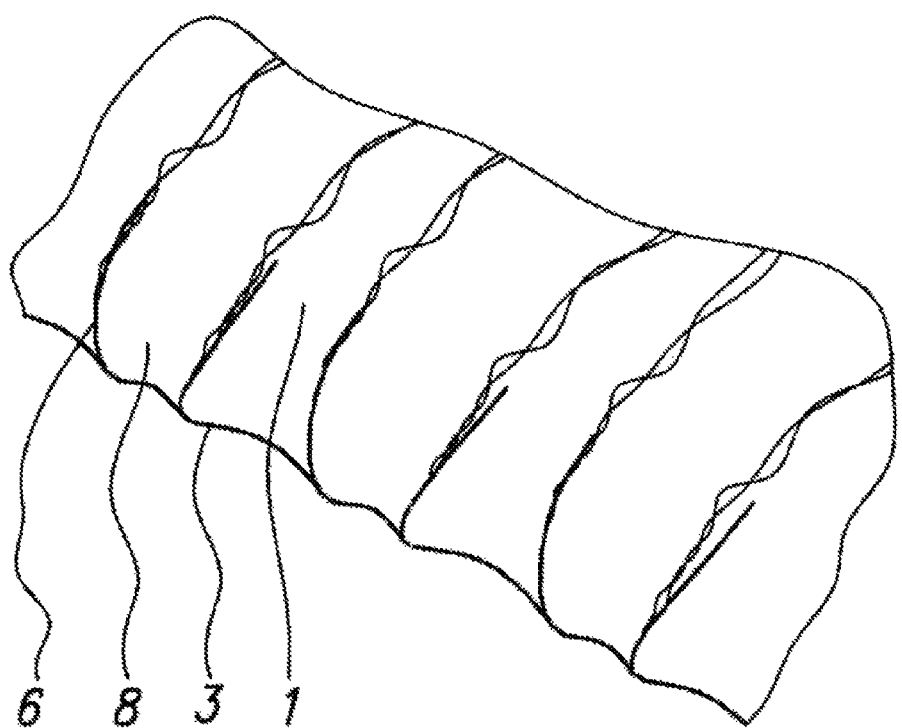
FIG. 4 represents an overall view of the front part of the aerodynamic surface with the elevations in their third embodiment.

As it is illustrated in FIG. 4, the elevations can be formed by a number of saddle-shaped surfaces 8 having a negative curvature, mating with each other to form the working edges 5 and smoothly developing into both sides of the aerohydrodynamic surface. In this case, the projection of the leading edge 3 onto the plane of the chords is a combination of concave arcs of a constant or variable radius that are mating with each other.

Figure 5:
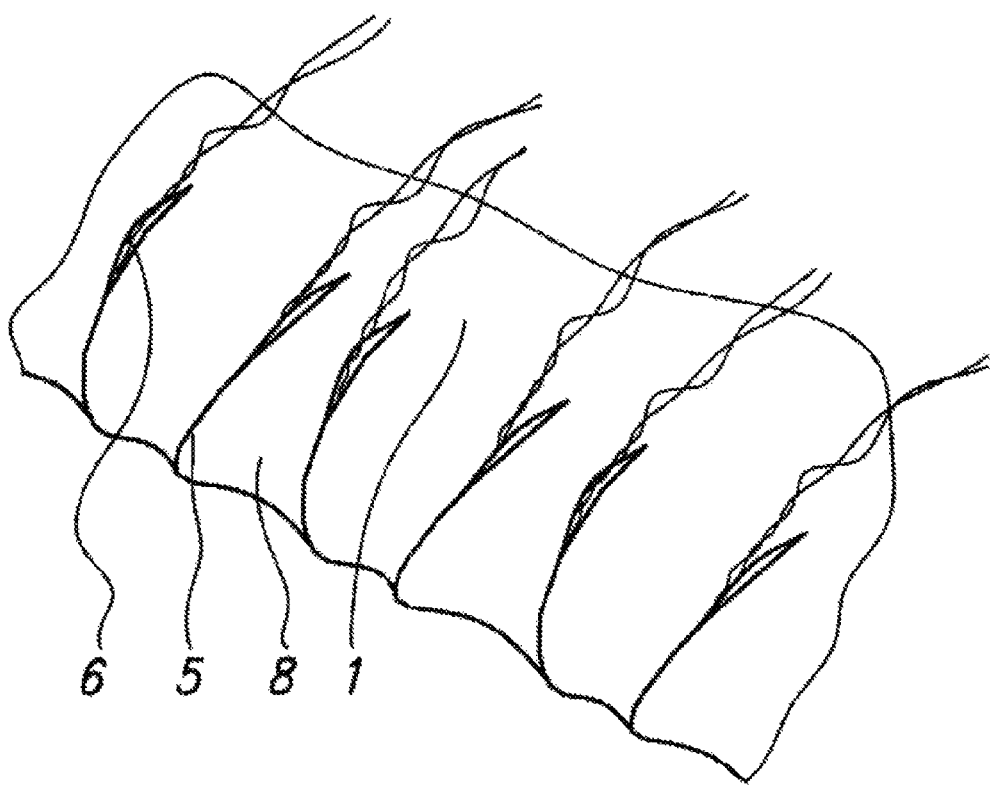
FIG. 5 is an overall view of the front part of the aerodynamic surface with the elevations in their fourth embodiment.

As it is shown in FIG. 5, the elevations can be made in the form of a combination of the saddle-shaped surfaces 8 of a negative curvature or the protrusions 7 with the strakes 6. In this case, the aerohydrodynamic surface is designed with an asymmetrical streamlined profile, and the strakes 6 are mounted on the side of the aerohydrodynamic surface having a larger curvature and smoothly mate with the edges of the protrusions 7 or the conjunctions of the saddle-shaped surfaces 8, and the working edges 5 smoothly develop from the edges of the protrusions 7 or the conjunctions of the saddle-shaped surfaces 8 into the strakes 6.

In addition to the differences in the type of the elevations, the array of vortex generators of the proposed aerohydrodynamic surface is also characterized by embodiments of the working edges 5.

Figure 20:
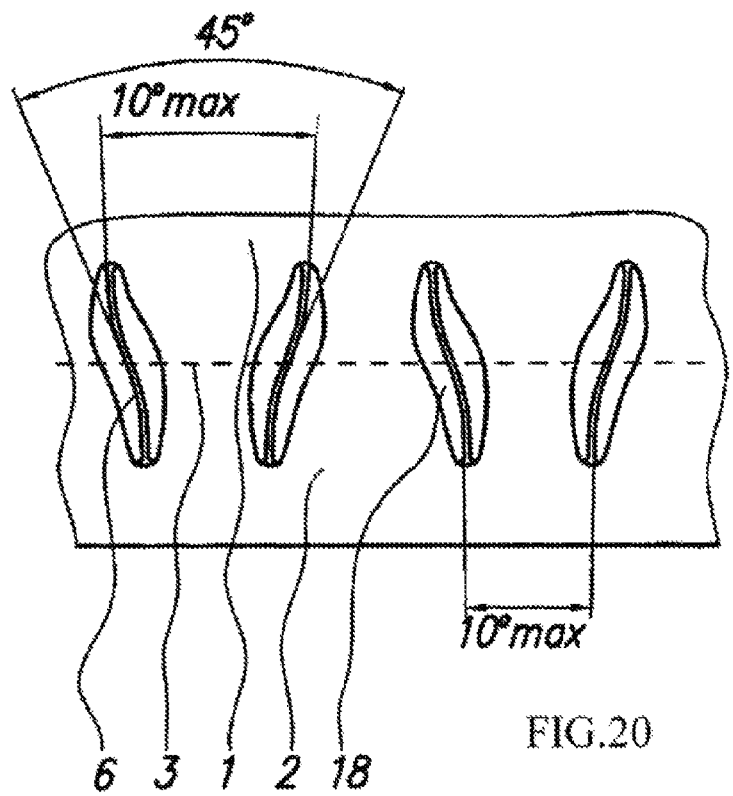
FIG. 20 shows a array of vortex generators according to one of the embodiments of the invention, front view.

For example, as it is illustrated in FIG. 20, the working edges 5 can be additionally bent so that their frontal projections are S-shaped, wherein the tangents to the ends of the frontal projections of the adjacent working edges are located at an angle of no more than 10° to each other so as to be able to reduce the power of parasitic vortex generation.

Figure 21:
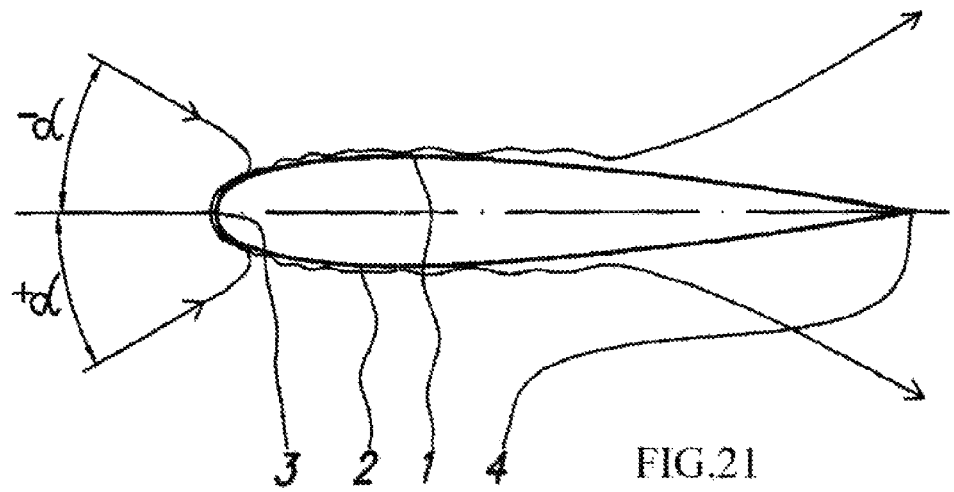
FIG. 21 represents a flow diagram of an aerodynamic surface according to one of the embodiments of the array of vortex generators at positive and negative angles of attack.
Figure 22:
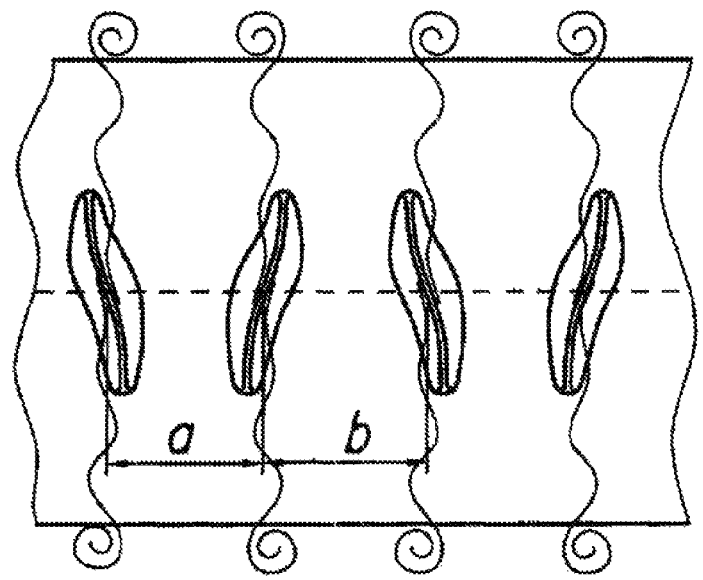
FIG. 22 illustrates a array of vortex generators according to another embodiment, front view.

Furthermore, as it is shown in FIGS. 21 and 22 when the elevations are implemented according to FIG. 2 or 4 as well as when the main part is fully or partially designed with a symmetrical streamlined profile, the lateral projections of the working edges 5 can also be symmetrical relative to the midline of the streamlined profile and two adjacent distances between the points of intersection of the frontal projections of the adjacent working edges with the frontal projection of the leading edge differ from each other by no more than 10%.

Figure 23:
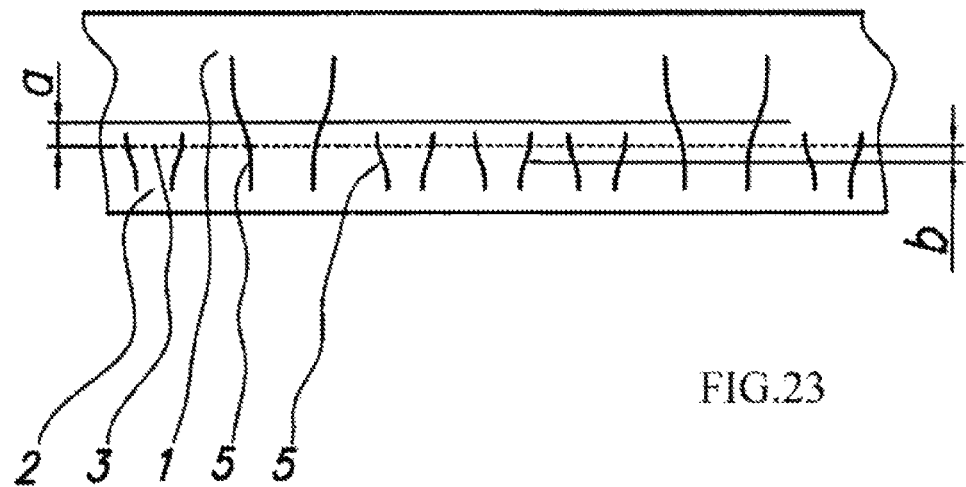
FIG. 23 represents a array of vortex generators according to one more embodiment, front view.
Figure 24:
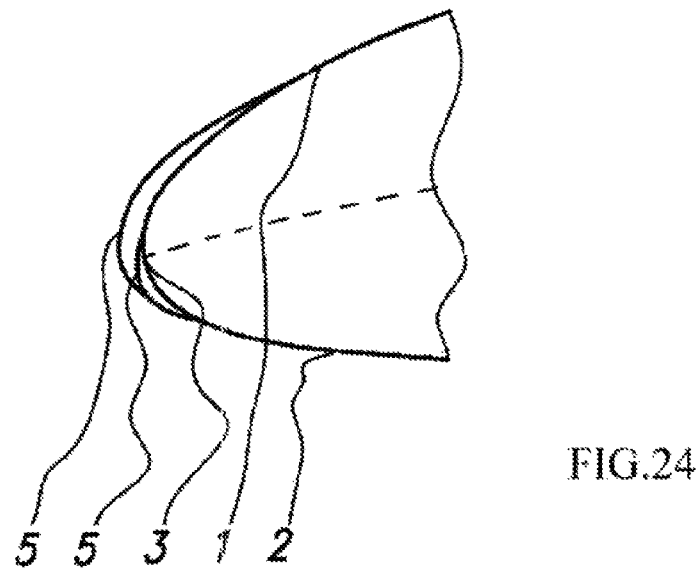
FIG. 24 shows the same, side view.

In addition, as it is shown in FIG. 23, the array of vortex generators may include elevations that form working edges 5 of at least two standard sizes, the working edges being arranged in pairs. Each of the pairs of working edges 5 is configured to generate counter-rotating vortex structures and at least one pair of working edges 5 of a larger standard size that is configured to equalize the boundary layer energy along the chord and span of one of the sides of the aerohydrodynamic surface is located between two pairs of working edges 5 of a smaller standard size. In this case, as it is illustrated in FIG. 24, the aerohydrodynamic surface is designed with an asymmetrical streamlined profile and the frontal projections of the working edges 5 of the larger and smaller standard sizes are offset relative to each other. The midpoint of the frontal projections of the working edges 5 of the larger standard size are offset in the bending direction of the midpoint of the streamlined profile relative to the midpoint of the frontal projections of the working edges 5 of the smaller standard size.

Furthermore, various embodiments of the aerohydrodynamic surface are possible.

Figure 26:
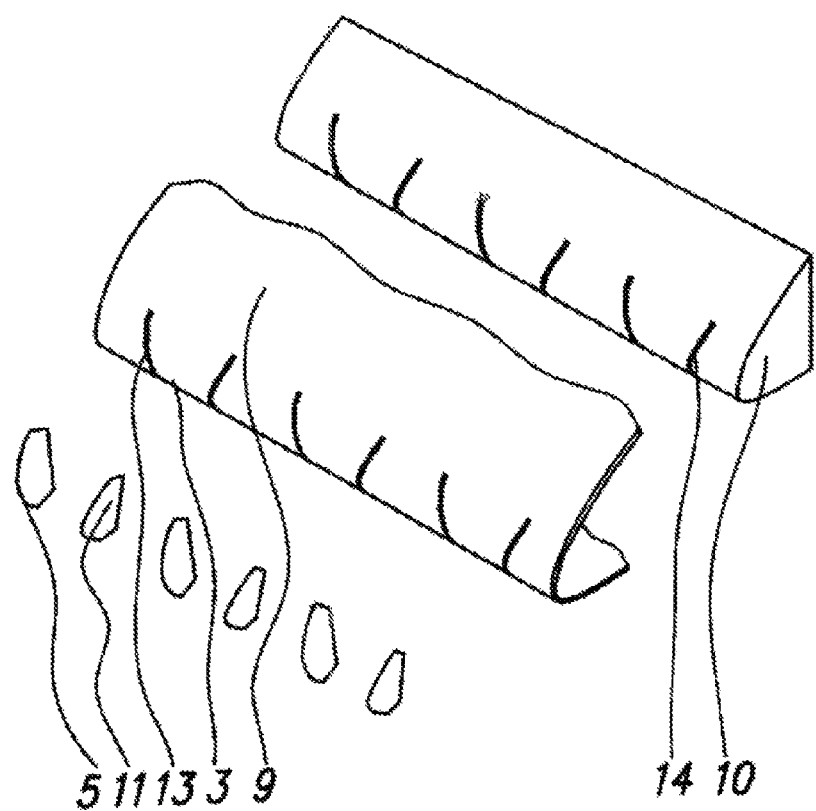
FIG. 26 represents an aerohydrodynamic surface in accordance with one more embodiment of the invention, exploded perspective view.
Figure 27:
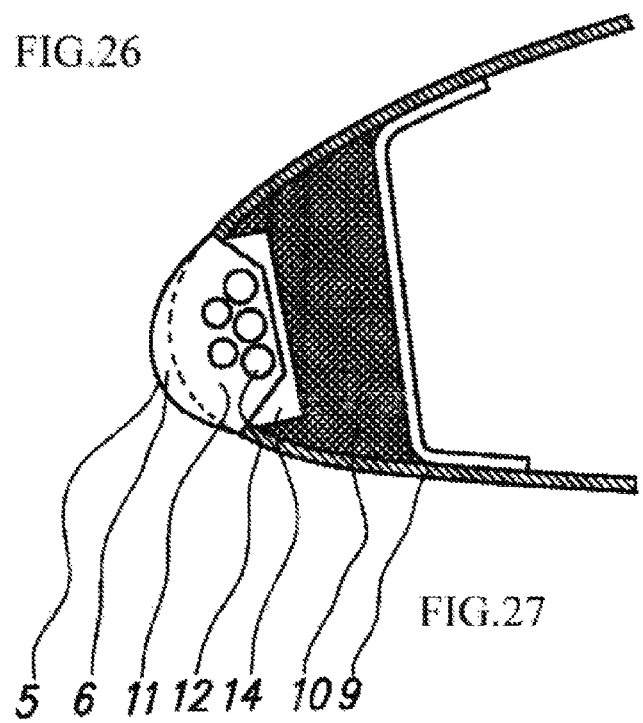
FIG. 27 shows the aerohydrodynamic surface according to FIG. 26, sectional view.

As it is shown in FIGS. 26 and 27, the aerohydrodynamic surface illustrated in FIG. 2 may further comprise a leading-edge skin 9 and a core 10. In this case, the array of vortex generators is made in the form of plates 11 with holes 12, the leading-edge skin 9 is made of a sheet material, and the core 10 is made of a foamed polymer material and is glued to the leading-edge skin 9 with an adhesive composition. The leading-edge skin 9 and the core 10 are made with slots 13 and 14, wherein the slots of the core 13 are in communication with the slots of the leading-edge skin 14, and the plates 11 are mounted in the slots 13 and 14 and are fixed with the adhesive composition. The outer parts of the plates 11 protruding beyond the dimensions of the leading-edge skin 9 form the strakes 6 with the working edges 5.

Figure 28:
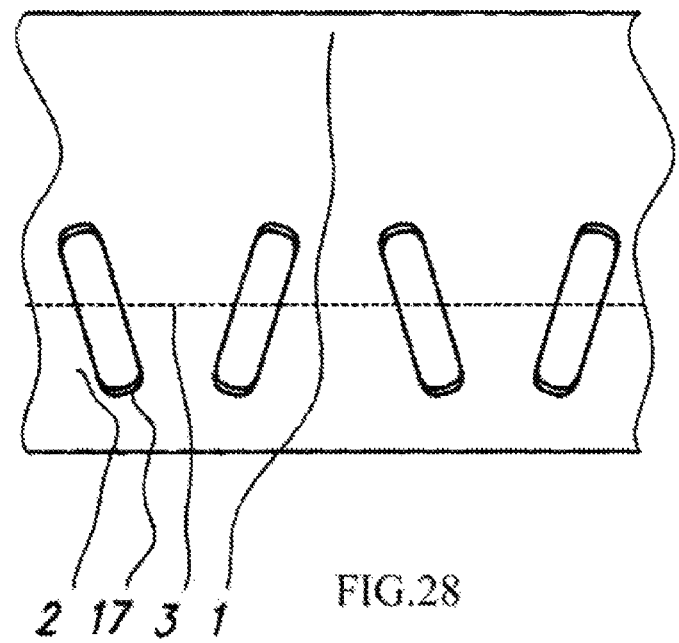
FIG. 28 is an aerohydrodynamic surface in accordance with another embodiment of the invention, front view.
Figure 29:
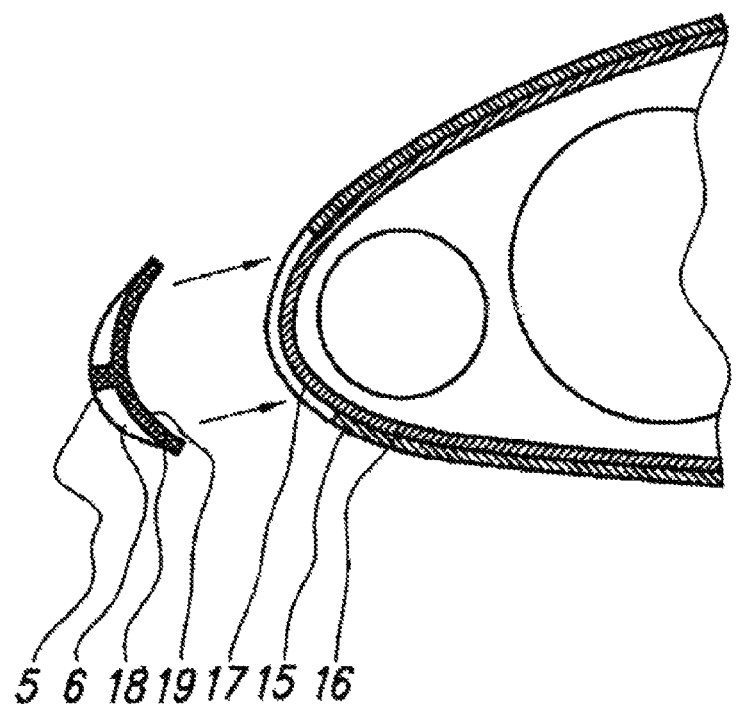
FIG. 29 shows the aerohydrodynamic surface according to FIG. 28, sectional view.

As it is shown in FIGS. 28 and 29, the aerohydrodynamic surface illustrated in FIG. 2 may further comprise a two-layer leading-edge skin consisting of an outer layer 15 and an inner layer 16. The outer layer 15 is made with a group of cut-outs 17. At the same time, the array of vortex generators is made in the form of a set of overlays shown in FIGS. 40-42, each overlay including a base 18 with a bearing surface 19 developing into one or two strakes 6. The bases 18 of the overlays are mounted in the cut-outs 17 of the outer layer 15 of the leading-edge skin 9 so as to be able to reduce the aerodynamic resistance, and the thickness of the outer layer 15 is greater than or equal to the thickness of the bases 18.

The embodiments of the aerohydrodynamic surface shown in FIGS. 26-29 are considered with respect to a wing console 20 of a light aircraft (FIG. 30) and a slotted aileron 21 pivotally mounted thereon. In this case, the wing 20 further comprises flaps 22 and tips 23, and the light aircraft, in addition to the wing, further comprises a power plant 24, a fuselage 25, a vertical tail 26, a horizontal tail 27, and a chassis 28.

Figure 31:
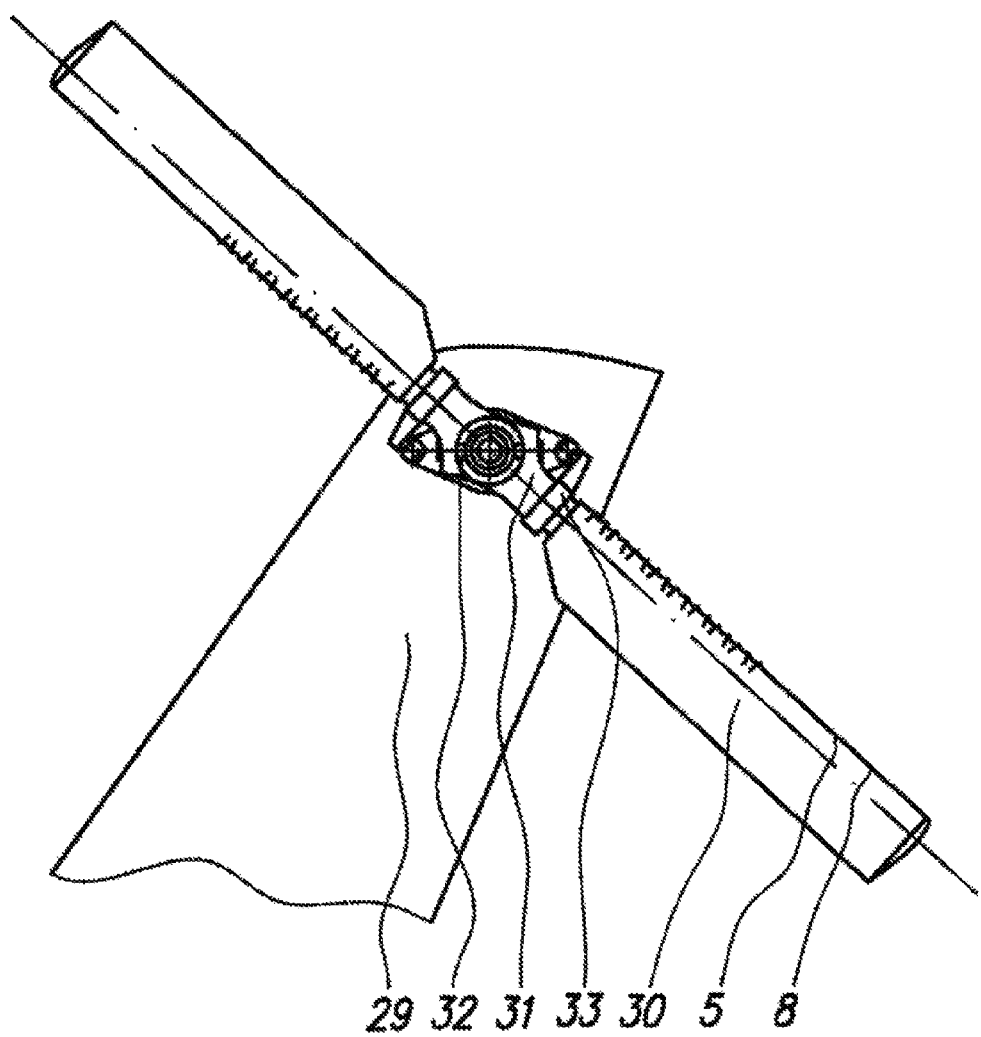
FIG. 31 is an antitorque rotor of a helicopter with blades on which the vortex generators according to the invention are mounted.

The embodiment of the aerodynamic surface shown in FIG. 4 is considered with respect to a tail rotor of a helicopter (FIG. 31) mounted on the tail boom 29 and comprising blades 30, a bushing 31 with a swing joint 32 and axial joints 33.

Figure 35:
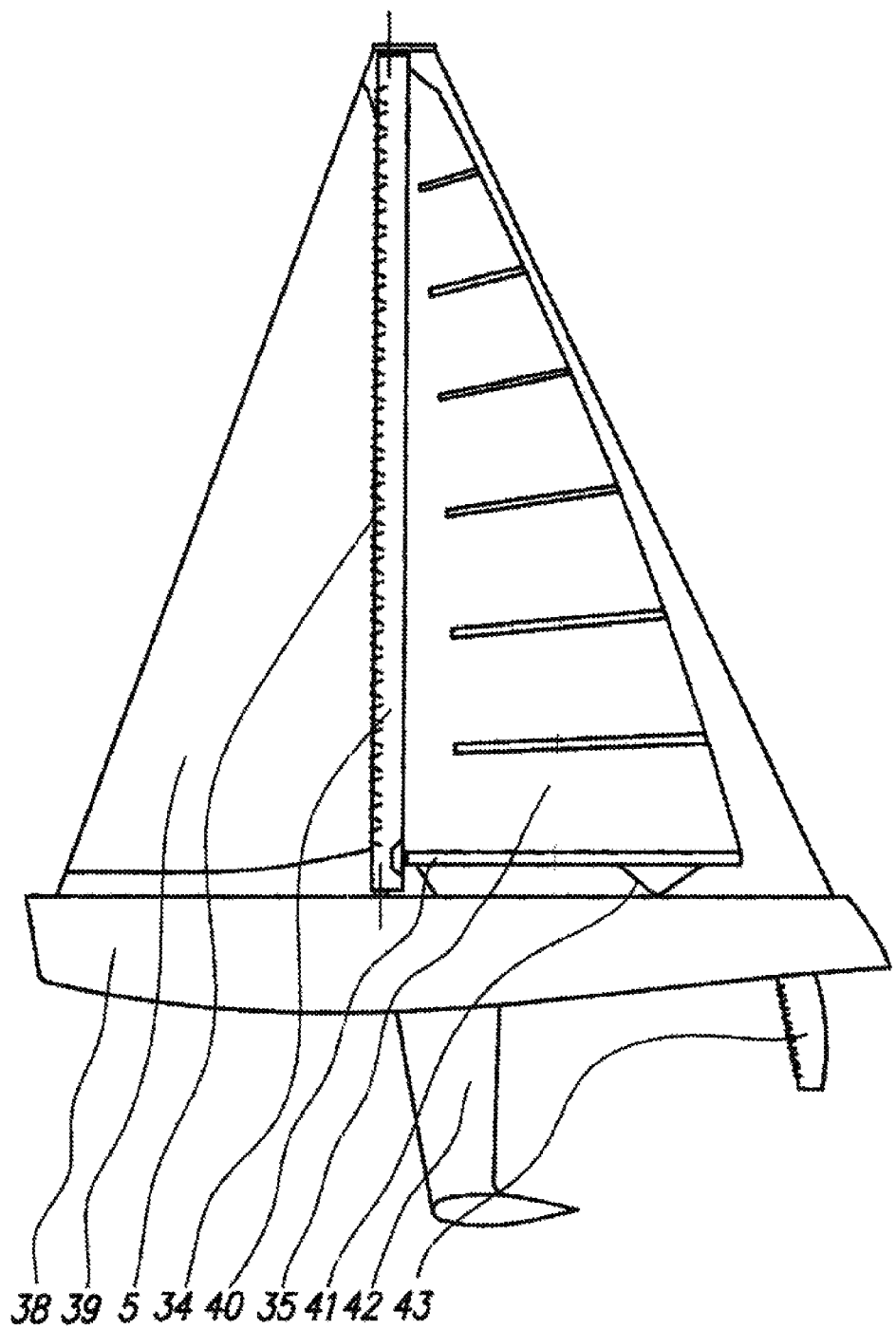
FIG. 35 is an overall view of a sailing yacht with vortex generators according to one of their embodiments that are mounted on an all-movable mast.
Figure 36:
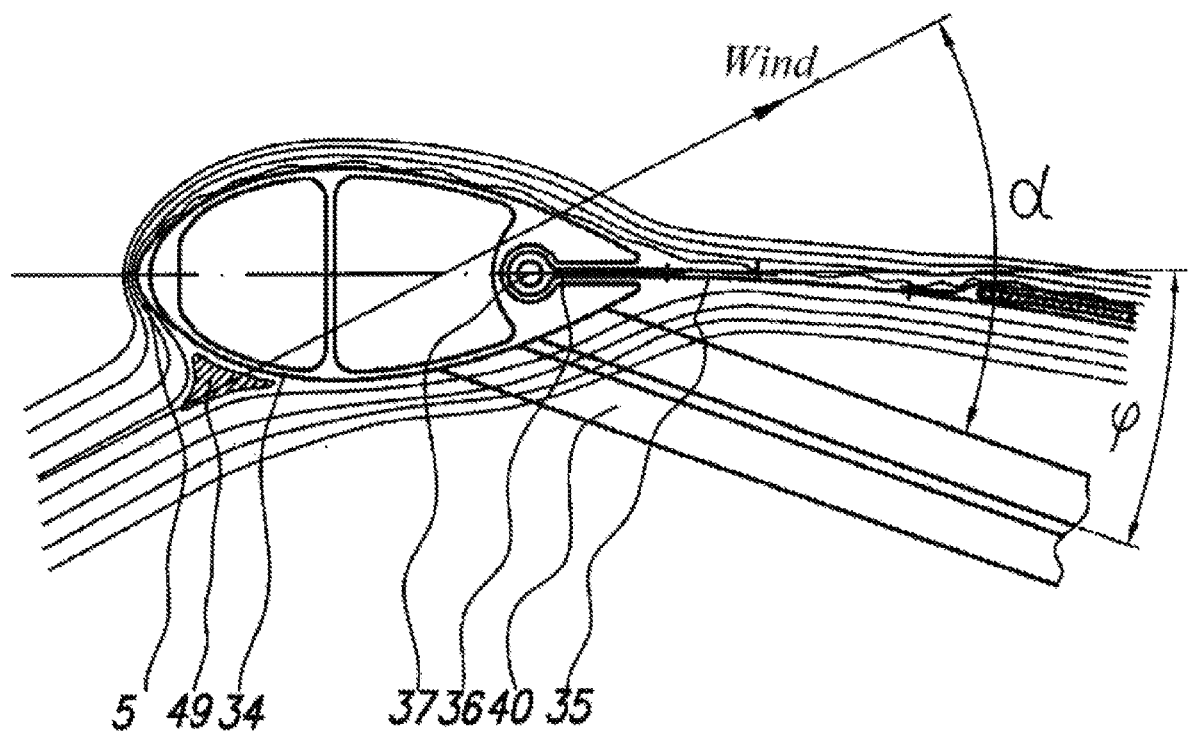
FIG. 36 shows a diagram of a flow around ab aerodynamic surface of the sailing yacht according to FIG. 35 while sailing free.

Furthermore, in addition to "one-piece profiled" embodiments of the aerohydrodynamic surface, the aerohydrodynamic surface can be formed longitudinally by a combination of profiled and membrane sections, as it is shown in FIG. 36. At the same time, the profiled section is made in the form of an all-movable mast 34, and the membrane section is made in the form of a fore-and-aft sail 35 mounted on the trailing edge of an all-movable mast 36 using a mast groove 37 into which a boltrope of the fore-and-aft sail 35 sewn into a luff 38 wound. In this case, the array of vortex generators mounted on the all-movable mast can be implemented in any embodiment corresponding to those shown in FIGS. 21 and 22. This embodiment is considered with respect to the sailing yacht shown in FIG. 35 and comprising a body 39, a staysail 40, a boom 41, a boom sheet 42, a keel 43 and a rudder blade 44. Moreover, the array of vortex generators corresponding to those illustrated in FIGS. 21 and 22 can also be included in the composition of the rudder blade 44.

Figure 39:
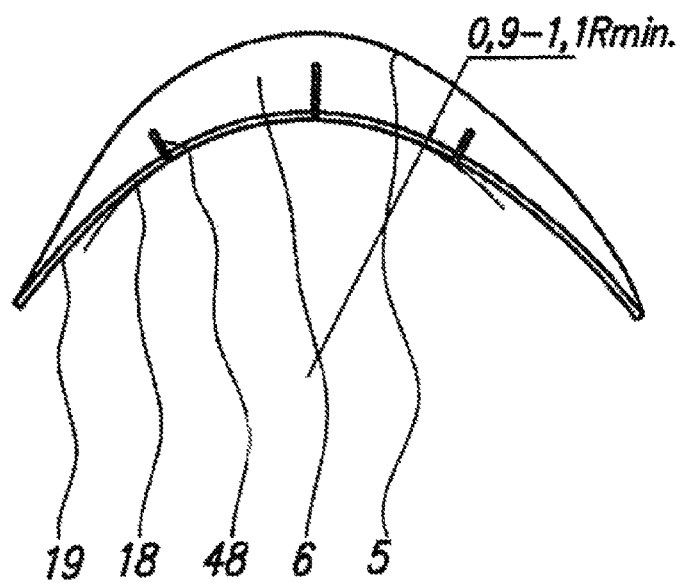
FIG. 39 shows an overlay of a wind generator with transverse slots, side view.

The array of vortex generators designed for mounting onto the aerohydrodynamic surface shown in FIG. 36 is made in the form of the set of overlays, each overlay including the base 18 with the bearing surface 19 as well as at least one elevation with at least one working edge 5, as it is shown in FIG. 39. At the same time, the minimum radius of curvature of the bearing surface of the overlay is from 90 to 110% of the minimum radius of bluntness of the leading edge of the aerohydrodynamic surface.

Figure 40:
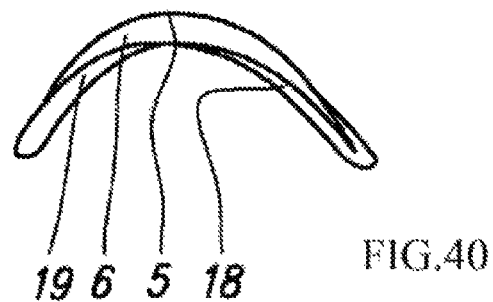
FIGS. 40 and 41 represent overall views of overlays of two types.
Figure 41:
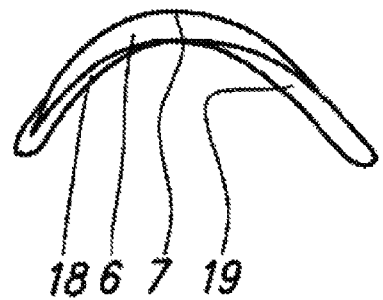

Furthermore, each of the overlays can be designed with one strake 6 developing into the base 18, wherein the group comprises two types of overlays illustrated in FIGS. 40 and 41, respectively. The bases 18 of the overlays are made with clockwise or counter-clockwise twisting, and the two types of the overlays are characterized by the opposite twisting direction of the base 18.

Figure 42:
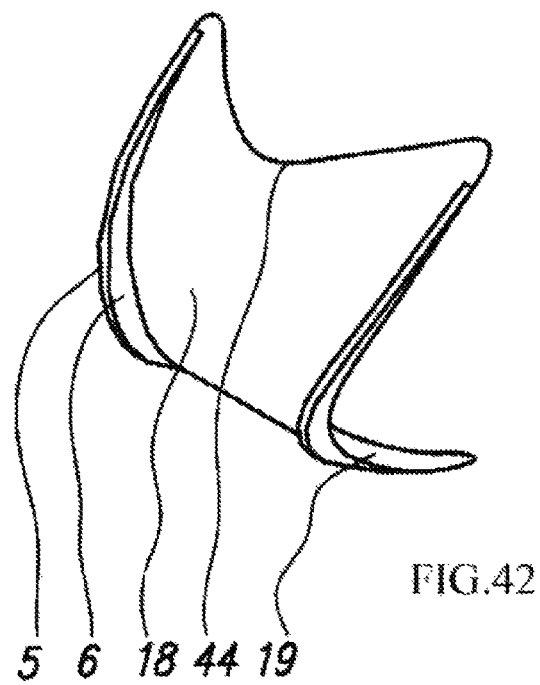
FIG. 42 illustrates an overall view of an overlay with two strakes mounted on the base with a narrowing in the middle part.

Each of the overlays can be designed with two strakes 6 mounted on the base 18, as it is shown in FIG. 42. In this case, the base 18 is made with a narrowing 45 in the middle part, and the outer edges of the strakes 6 form paired working edges 5.

Figure 43:
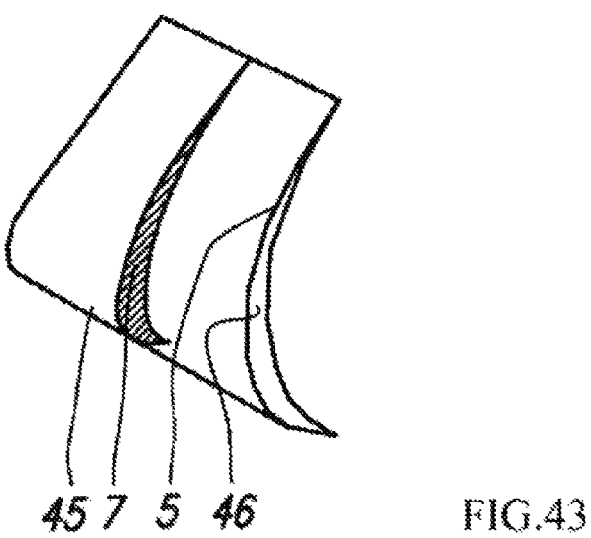
FIG. 43 is an overall view of an overlay in another embodiment thereof.
Figure 44:
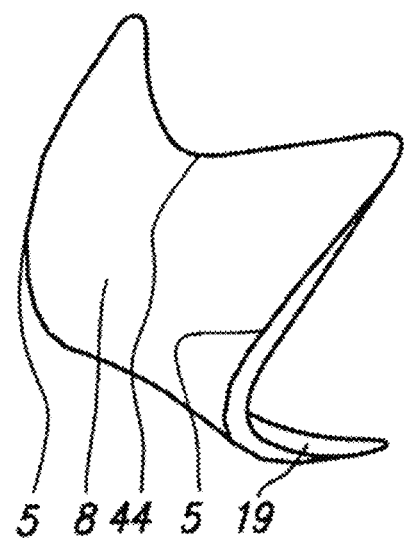
FIG. 44 represents an overall view of an overlay in one more embodiment thereof.

Moreover, as it is illustrated in FIG. 43, each of the overlays can be made in the form of a base 18 having a trapezoidal shape and configured to form an elevation in the form of the protrusion 7 formed by the front surface 46, the two side surfaces 47 and the bearing surface 19. Paired working edges 5 are formed by mating the front surface 46 with the side surfaces 47 At the same time, the front surface of the base may include the saddle-shaped surface 8 being adjacent to the side surfaces 47 with the formation of the working edges 5, as it is shown in FIG. 44.

Figure 45:
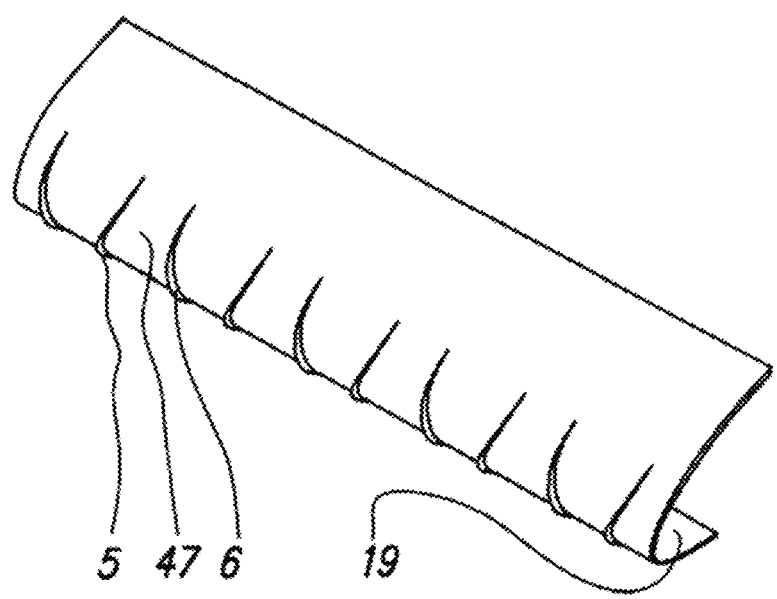
FIG. 45 illustrates an overall view of an overlay in the form of a boot.

In addition, as it is shown in FIG. 45, each of the overlays can be made in the form of a boot 42 including at least two pairs of working edges 5, which can be located on different types of elevations.

As it is illustrated in FIG. 39, each of the overlays can be designed with at least one transverse slot 48.

The aerohydrodynamic surface shown in FIG. 2, regardless of the design features and the type of fluid, operates as follows.

Figure 6:
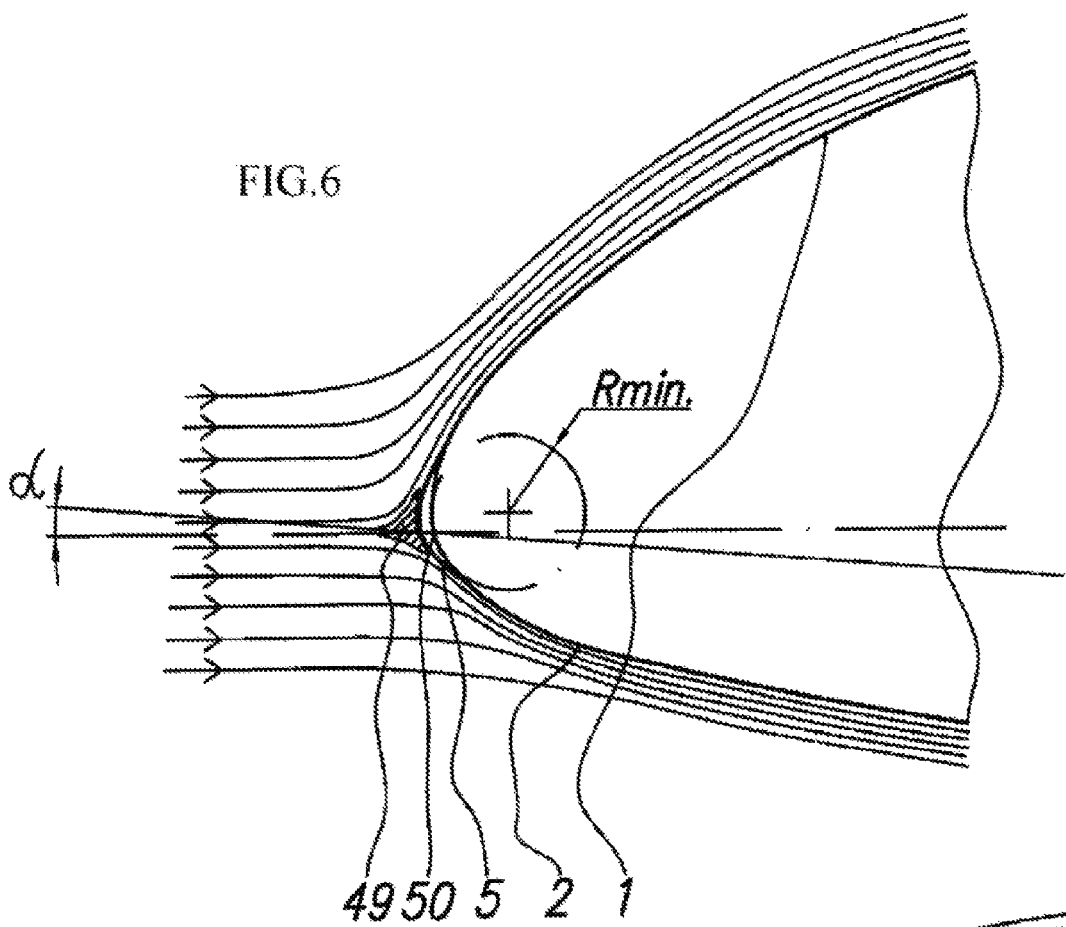
FIG. 6 represents a flow diagram of the aerodynamic surface according to FIG. 1 at near-zero angles of attack.

At near-zero angles of attack, the strakes 6 enveloping the leading edge 3, smoothly mating with both the upper side 1 and the lower side 2 of the aerohydrodynamic surface, due to their small sizes, are almost entirely located in a flow stagnation zone 49 disposed near the leading edge 3, which, given the relatively small sizes of the strakes 6, practically eliminates the parasitic vortex generation at the working edges 5. The flow stagnation zone 49 is characterized by the minimum flow kinetics and the maximum value of static pressure. Furthermore, due to the absence of a unidirectional flow of the boundary layer through the array of vortex generators, the strakes 6 are "switched out" from use and almost do not create additional profile drag in a situation where it is necessary to have a sufficiently extended zone of the laminar flow of the boundary layer for the best realization of the aerohydrodynamic profile properties. This flow regime is shown in FIG. 6.

Figure 7:
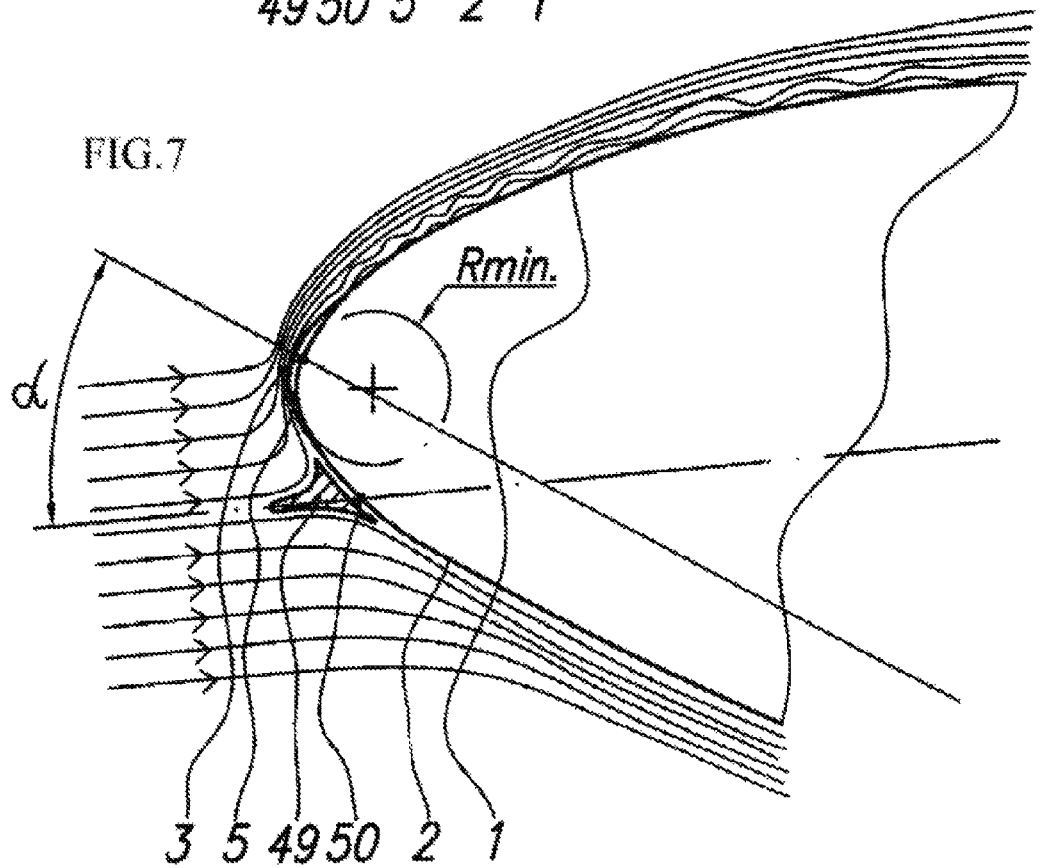
FIG. 7 is a flow diagram of the aerodynamic surface according to FIG. 1 at subcritical angles of attack.

As the angle of attack α increases, the flow separation point 50 gradually moves away from the leading edge 3 and sinks down to the lower side 2. This creates a stable unidirectional flow of the boundary layer from the lower side 2 through the leading edge 3 to the upper side 1. At the same time, the strakes 6 gradually exit from the flow stagnation zone 49, which smoothly increases the flow rate at the working edges 5 and the power of the generated vortex structures. This flow regime over the front of the aerodynamic surface is shown in FIG. 7. At the same time, due to the increase in the boundary layer energy, the total pressure on the ascending part of the upper arch of the aerofoil section decreases, which increases the value of Cy for a given angle of attack and, accordingly, decreases the inductive drag of the aerohydrodynamic surface.

Figure 8:
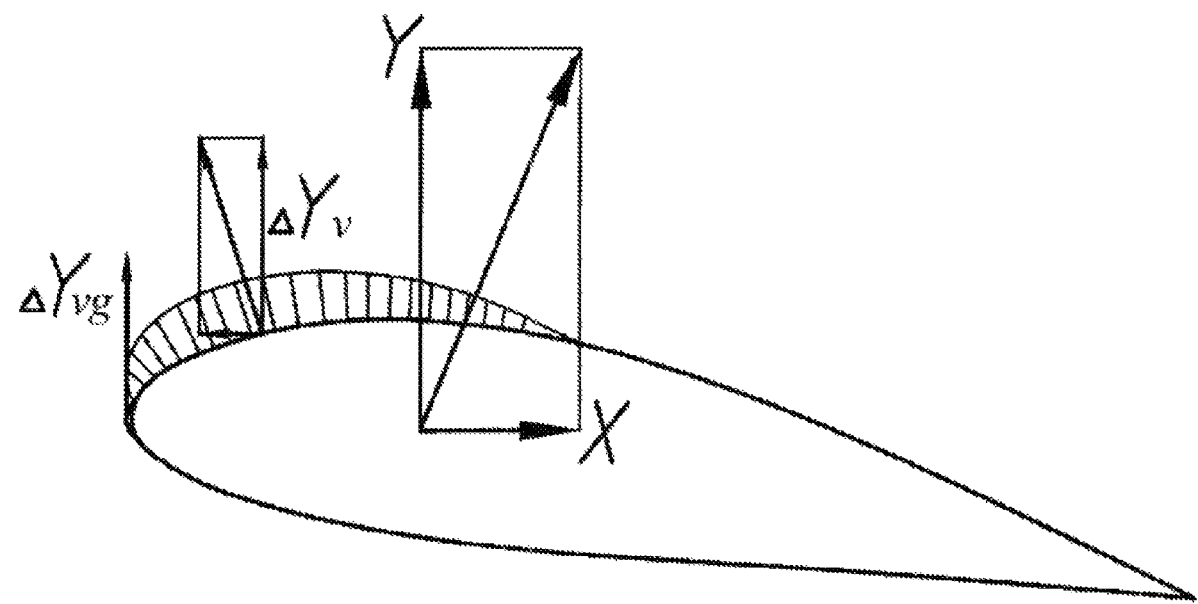
FIG. 8 represents a diagram of distribution of increments of aerodynamic forces with the array of vortex generators according to the invention at the leading edge.
Figure 9:
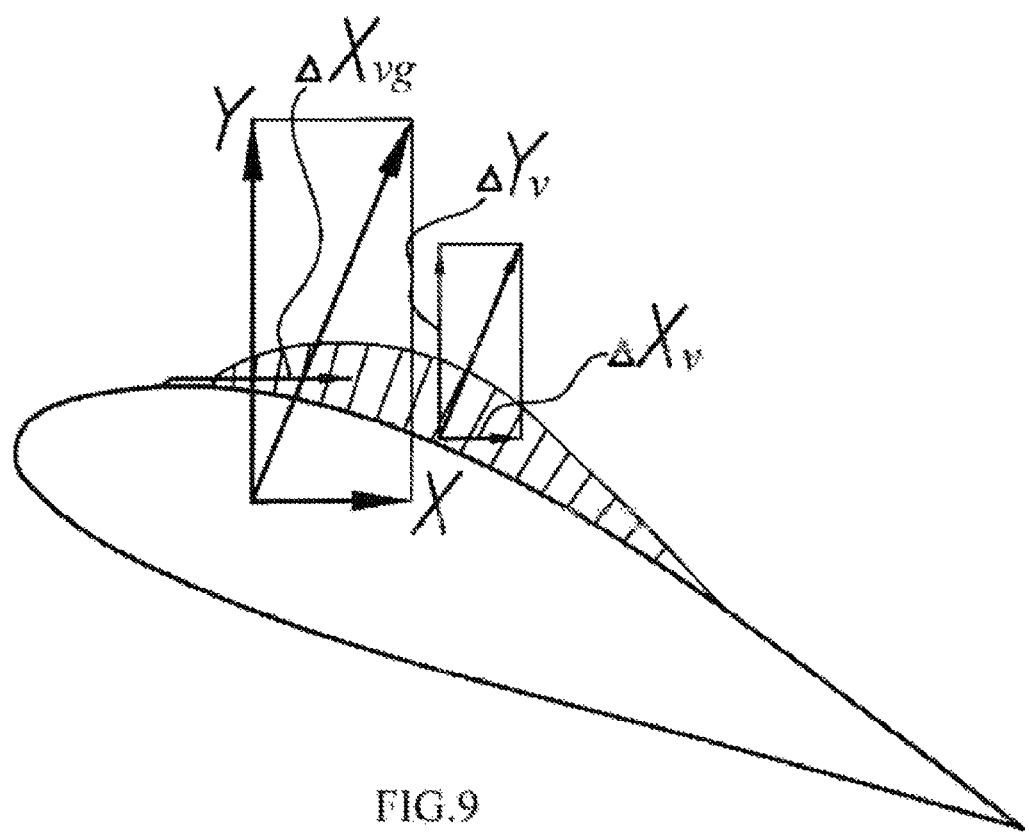
FIG. 9 is a diagram of distribution of increments of aerodynamic forces with the known array of vortex generators on the upper side.
Figure 14:
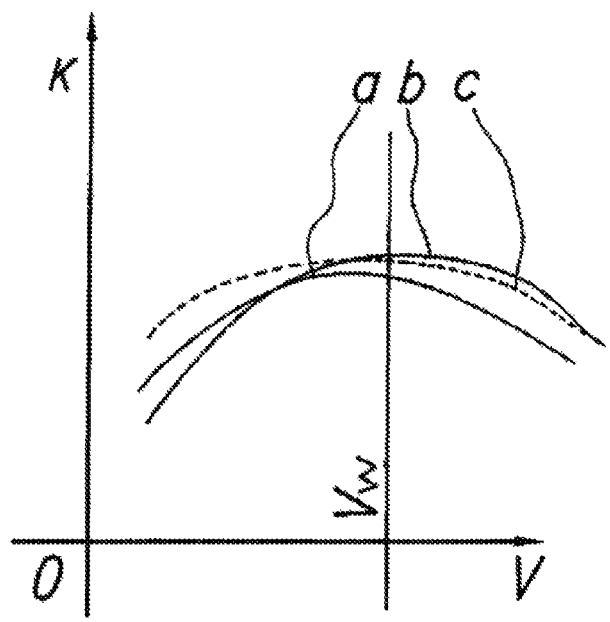
FIG. 14 is simplified graphs of the dependence of a lift over drag ratio on a flight speed on the known wings and on the wing with the aerodynamic surface according to the invention.

At the same time, the growth of Cx on such aerohydrodynamic surface presumably occurs with a lag behind the growth of Cy, which is partly explained by the upward direction of the vector of the drag force Yvg created by the pressure difference between the sides of the strakes 6 as well as the forward-directed component of the vortex increment of the lift force ΔYv, due to which the vacuum created by the attached vortex structures, in addition to the lifting force, creates a small thrust force. These peculiarities of the operation of the array of vortex generators slightly improve the "elasticity" of the aerohydrodynamic surface with respect to the value of K, which is shown in FIG. 14 (a curve c) in comparison with a "clean" wing (a curve a) and with the known array of vortex generators (a curve b), especially when using an aerofoil section optimized for this task. These effects are illustrated in FIGS. 8 and 14.

Figure 10:
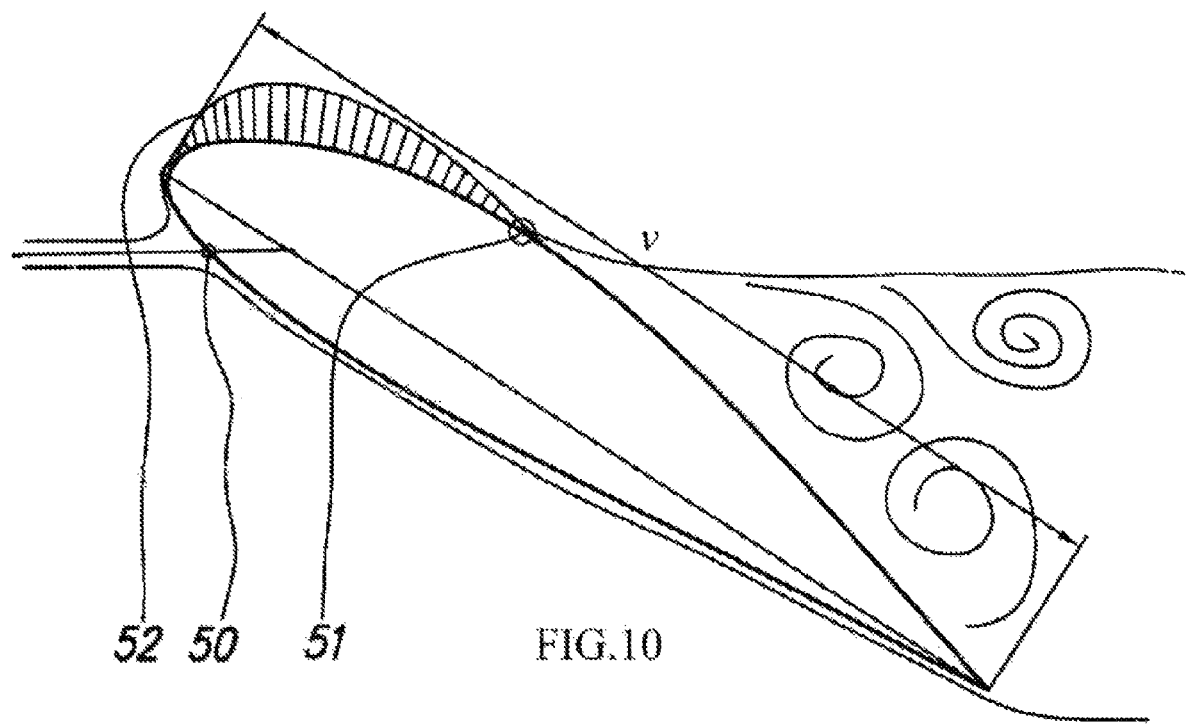
FIG. 10 represents a diagram of supercritical flow around the aerodynamic surface with the array of vortex generators according to the invention.
Figure 12:
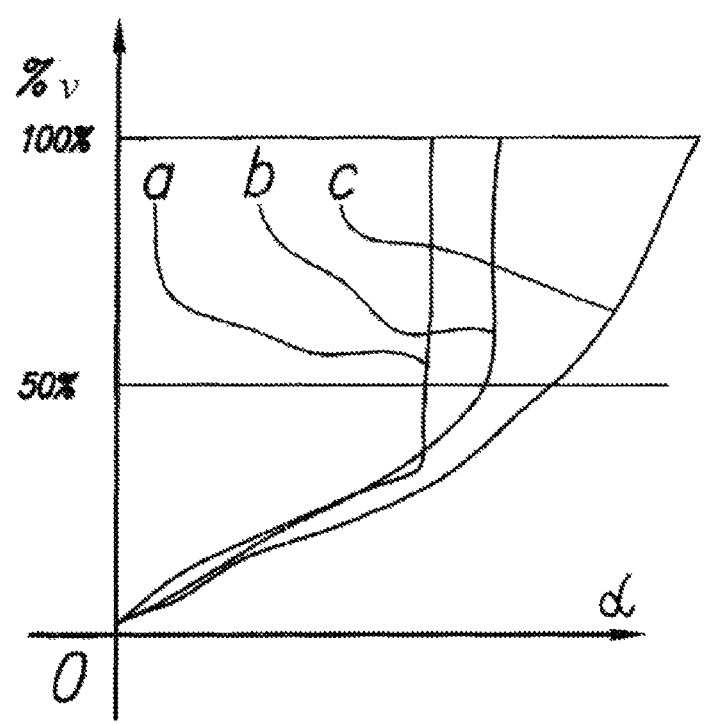
FIG. 12 is simplified graphs of the dependence of a position of a boundary layer separation point on an angle of attack on the known aerohydrodynamic surfaces and on the aerohydrodynamic surface according to the invention.

At subcritical angles of attack, the flow separation point 50 is located on the lower surface 2 at a considerable distance from the leading edge 3. At the same time, the flow in the boundary layer near the leading edge 3 occurs in one direction, and the vortex generation takes place along the entire length of the working edges 6, which corresponds to the maximum power of the generated vortex structures. Since there is a zone of increased pressure upstream of the strakes 6 located on the leading edge 3, the boundary layer flowing from the lower side 2 through the leading edge 3 and interacting with the strakes 6 is located in the zone of dynamic compression and retains the minimum initial energy required for stable vortex generation even with minimal values of the impact air pressure. In this case, the separation point of the boundary layer 51 moves very smoothly along the upper side 1 towards the leading edge 3, making it impossible to achieve complete separation of the boundary layer from the upper side 1 at supercritical angles of attack, which is shown in FIG. 10 and FIG. 12 (the curve c). This aspect is especially important in the context of improving the spin characteristics of aircrafts and gliders, since it helps to reduce the area of the reverse flow zone on the retarded wing console 20.

Figure 17:
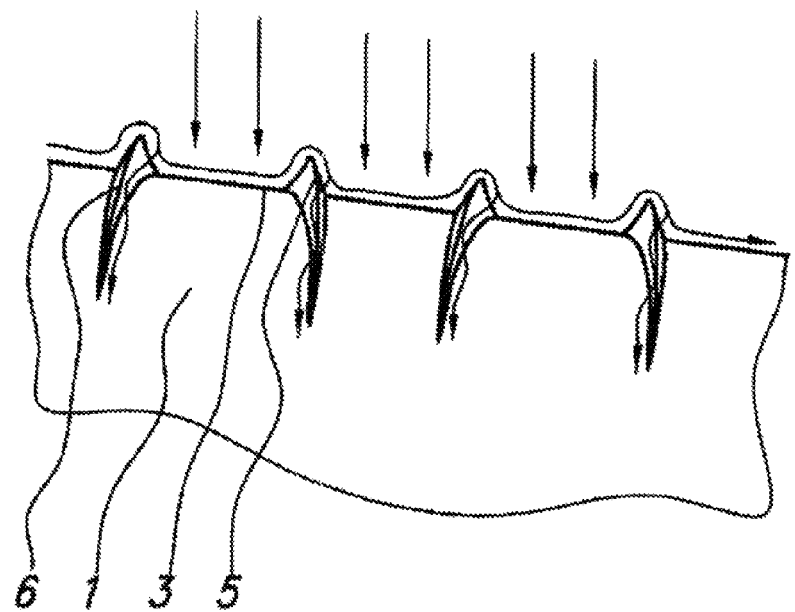
FIG. 17 is a scheme of "venting" the boundary layer near the stagnation zone of the flow on the aerohydrodynamic surface according to the invention in an oblique flow regime.
Figure 18:
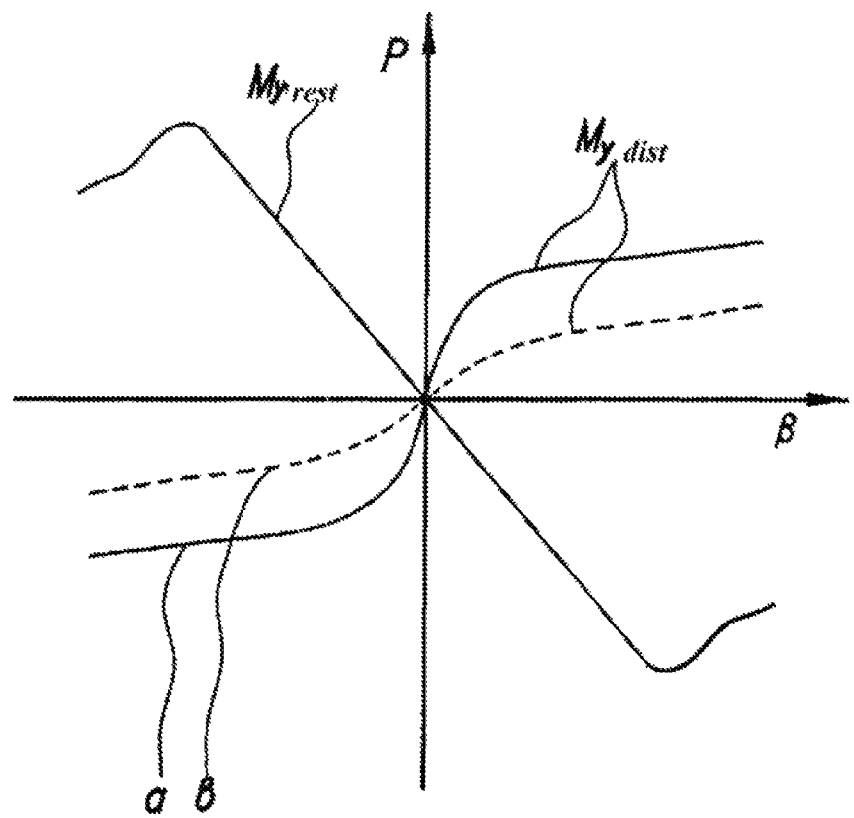
FIG. 18 represents simplified graphs of the disturbing and restoring yawing moments
Figure 19:
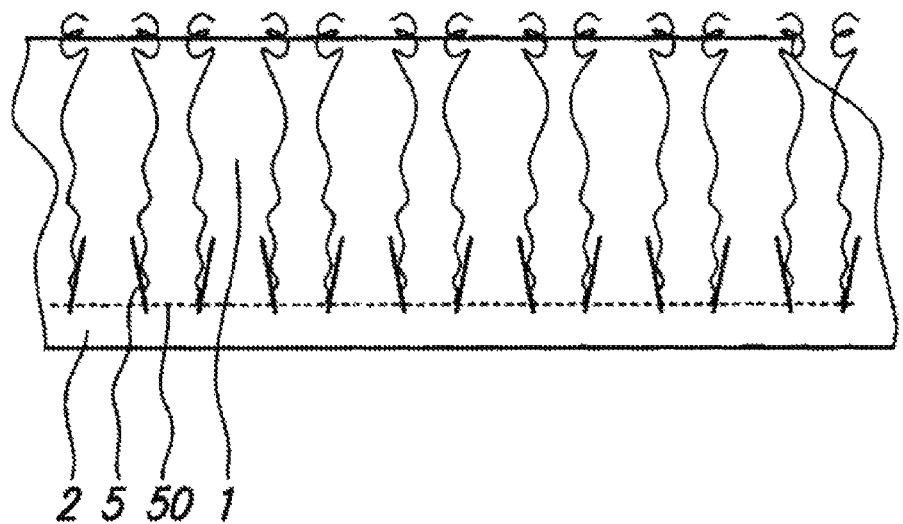
FIG. 19 is a scheme of formation of counter-rotating vortex structures on the aerodynamic surface according to the invention.

Furthermore, when the subcritical angle of attack α is combined with the sideslip angle β, there is a large number of aerodynamic strakes 5 on the leading edge 3, from each of which a bound vortex descends to the upper side 1. This bound vortex "vents" the compacted boundary layer located upstream of the leading edge, as a result of which there is a significant weakening of the boundary layer flow directed along the span of the aerodynamic surface, which plays a very important role in the development of asymmetric stall on the aircraft wing (FIG. 17 and the curve b in FIG. 18).

Figure 13:
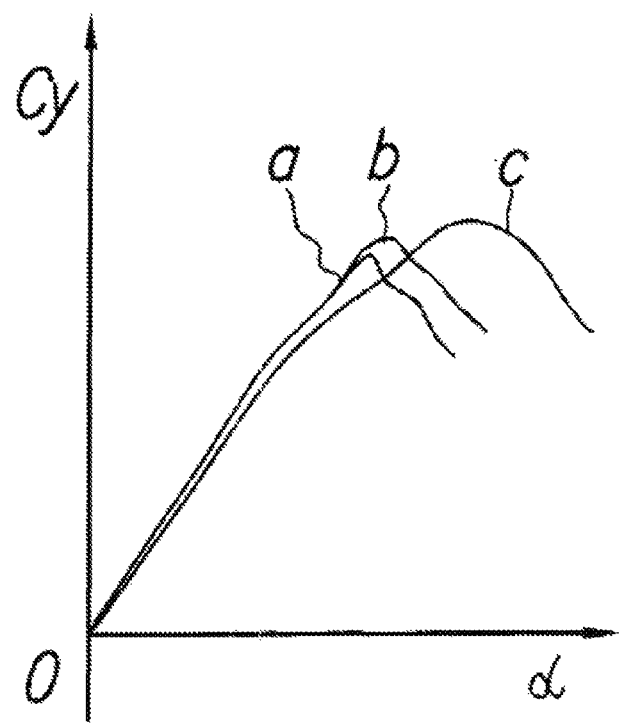
FIG. 13 represents simplified graphs of the dependence of a lift coefficient on an angle of attack on the known aerohydrodynamic surfaces and on the aerohydrodynamic surface according to the invention.

Moreover, the presence of the vortex generators implemented according to the invention on the leading edge implies a slight increase in the maximum value of the lift coefficient Cy (the curve c in FIG. 13) as compared to the aerodynamic surface with the known array of vortex generators located on the upper side (the curve b in FIG. 13) and the "clean" wing (the curve a in FIG. 13).

Figure 11:
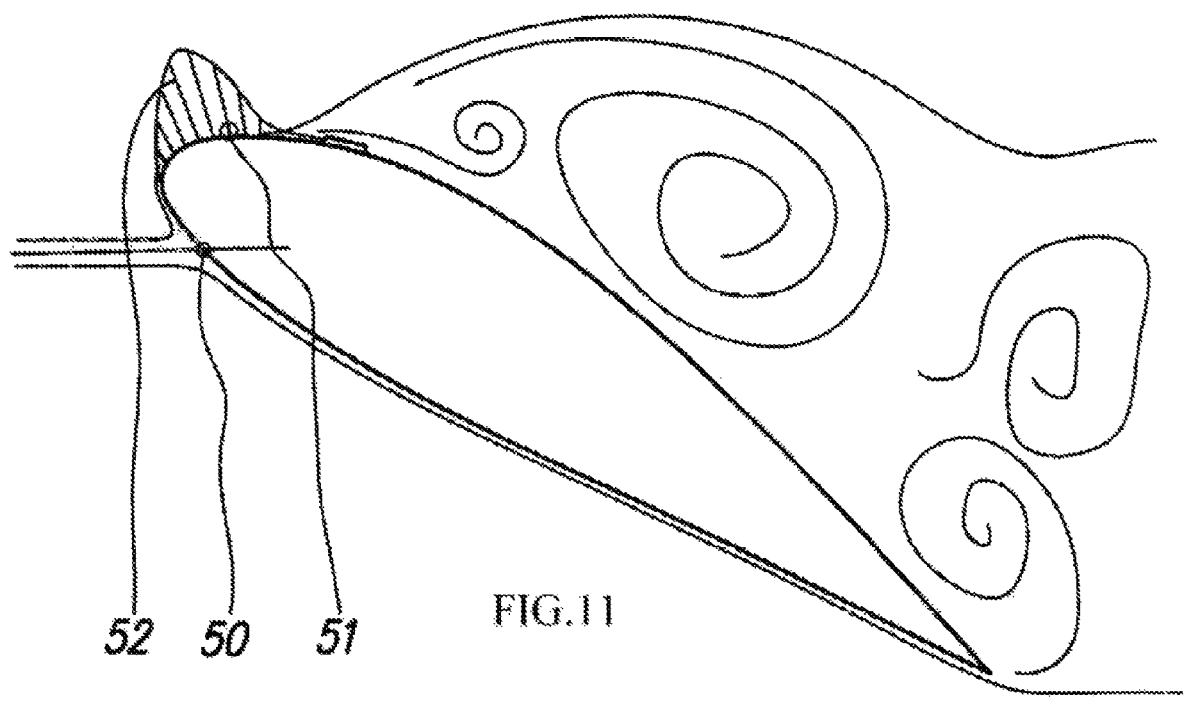
FIG. 11 represents a diagram of supercritical flow around the aerodynamic surface with the known array of vortex generators on the upper side.

Furthermore, a characteristic feature of the operation of the array of vortex generators according to the invention is the reduction or elimination of the "burst" of the nose-up pitching moment when the aerodynamic surface approaches the critical angle of attack due to the rearward displacement of the boundary layer separation point 51 along the upper arch of the aerofoil section. This circumstance is very important from the point of view of the stability of the aircraft in terms of the angle of attack at near-critical regimes and significantly expands the range of practical application of a number of high-lift aerofoil sections. This effect is illustrated by the difference in shape of the reduced pressure diagrams 52 in FIGS. 10 and 11.

The operation of the aerohydrodynamic surface shown in FIG. 3 slightly differs from the one described above with a higher efficiency of vortex generation, since the air flow coming off the sloped ledge formed by the edge of the protrusion 7 is retarded to a much lesser extent than when bending around the strake 6, which presumably should provide the aerohydrodynamic surface with a greater elasticity in terms of K at subcritical angles of attack.

Figure 32:
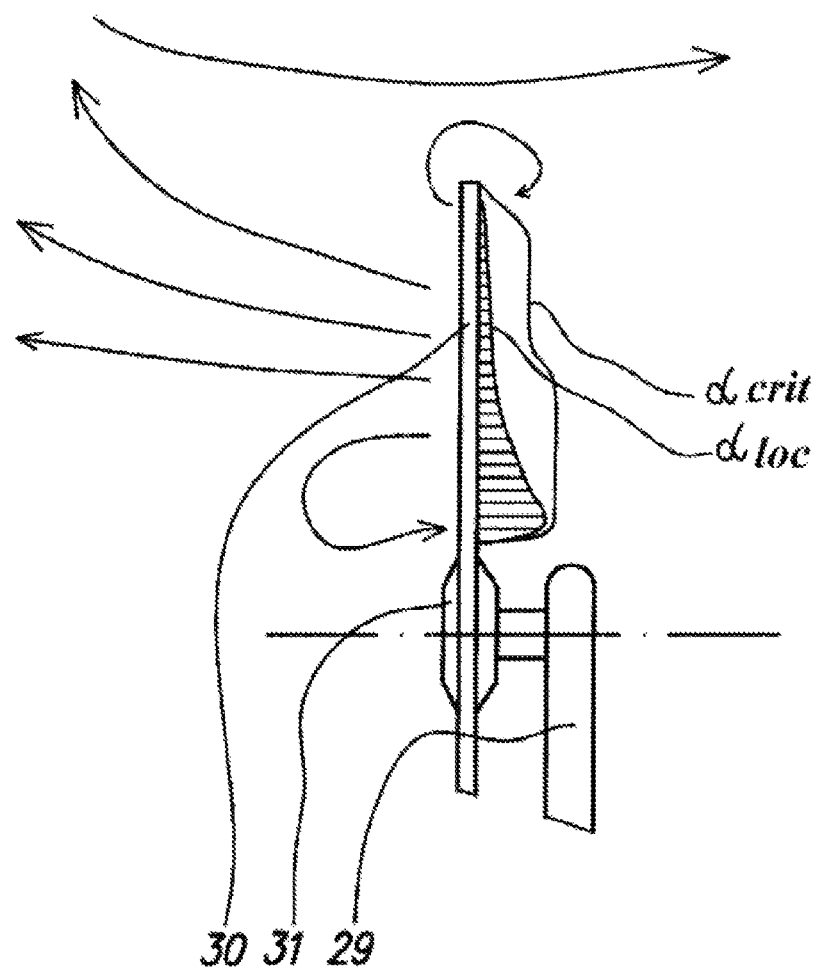
FIG. 32 represents a diagram of the initial stage of stalling the antitorque rotor flow of the helicopter.

The operation of the aerohydrodynamic surface shown in FIG. 4 and made in the form of a group of saddle-shaped surfaces 8 of a negative curvature is characterized by a greater "tolerance" to abrupt periodic changes in the angles of attack and sliding, that is, it most fully corresponds to the operating conditions of a propeller operating in an oblique blowing regime, for example, a helicopter antitorque rotor. At the same time, the use of such aerohydrodynamic surface as an antitorque rotor blade 30 increases the critical angle of attack of the blades 30 in the root part, which improves the response to directional control of the helicopter by delaying the propagation of the reverse flow in the root part over the entire span of the blade 30, the reverse flow arising from the rapid exit of the root part of the blade at supercritical angles of attack in the opposite direction of the main and inductive flows. This result is illustrated by the diagram shown in FIG. 32.

The operation of the aerohydrodynamic surface shown in FIG. 5 is characterized by a higher vortex generation power.

In addition to the embodiments of the elevations, the aerohydrodynamic surface according to the invention is further characterized by various alternatives of the shape and arrangement of the working edges 5 of the array of vortex generators, it should be noted at the same time that the same embodiments of the working edges are combined with different types of the elevations, therefore the final number of the embodiments of the array of vortex generators is determined by multiplying the number of the embodiments of the working edges by the number of the embodiments of the elevations, with the exception of certain cases due to incompatibility.

First of all, it is possible to make the working edges 5 with an S-shaped bend, as it is shown in FIGS. 20, 22 and 23. At the same time, the aerohydrodynamic surface is characterized by a reduced Cx at near-zero angles of attack, since the end sections of the working edges 5 located in downstream direction create less significant disturbances with a decrease in the volume of the stagnation zone as the impact air pressure increases, which makes it preferable to use such vortex generators on aerohydrodynamic surfaces formed by aerohydrodynamic profiles with a small radius of bluntness of the leading edge Rmin, the profiles designed to absorb high impact air pressures.

The operation of the group of vortex generator shown in FIGS. 21 and 22 is characterized primarily by the equality of the increment of the lifting characteristics of the aerohydrodynamic surface that are achieved at positive and negative angles of attack, which is of fundamental importance in many cases of application of the array of vortex generators according to the invention. For example, this effect is important for the wings of aerobatic aircrafts, an all-movable horizontal tail as well as a rig of yachts and ship steering elements. At the same time, it is important to note that the combinations of this embodiment of the working edges using the elevations shown in FIG. 3 are undesirable because of the fundamentally different flow conditions through the ledges at positive and negative angles of attack.

The operation of the array of vortex generators, which includes two standard sizes of the working edges 5 (FIGS. 23 and 24), differs from the one described above by a more uniform distribution of the boundary layer energy over the entire upper side 1, which, as applied to aircraft wings, favourably affects the lift over drag ratio and the efficiency of lateral control at high angles of attack. In this case, as it is shown in FIG. 25, the main zones of increasing the energy of the boundary layer 53, the zones formed by pairs of working edges 5 of a larger standard size, have the form of triangles progressively widening towards the trailing edge 4, and the distance between the pairs of working edges 5 of the larger standard size corresponds to the possible closure of the main regions of the increased energy of the boundary layer 53 near the trailing edge 4. At the same time, the supplementary regions of increasing the energy of the boundary layer 54, the regions formed by the working edges 5 of a smaller size, fill the gaps between the main regions of increasing the energy of the boundary layer 53 near the leading edge 3.

In this embodiment of the working edges 5, the lift over drag ratio is further increased due to the fact that as a result "dense" mounting of the working edges 5 of the larger standard size is not required for the distribution of the region of increasing the boundary layer energy over the entire area of the upper side 1 of the aerodynamic surface while maintaining the effective coverage of the part of the upper side 1 adjacent to the leading edge 3, which is accompanied by an unreasonable increase in the profile drag at low angles of attack as well as a significant loss of the boundary layer energy near the trailing edge 4 due to harmful interference of the adjacent vortex structures.

Furthermore, such embodiment of the array of vortex generators also provides an additional reduction in the profile drag of the aerodynamic surface at low angles of attack, since losses associated with the parasitic vortex generation by the working edges 5 of the larger size are eliminated, the vortex generation propagating to the lower side 2 at the most advantageous angle of attack, as well as from the point of view of the parasitic vortex generation by the working edges 5 of the smaller standard size, which are located in the flow stagnation zone 49 in this case.

Figure 30:
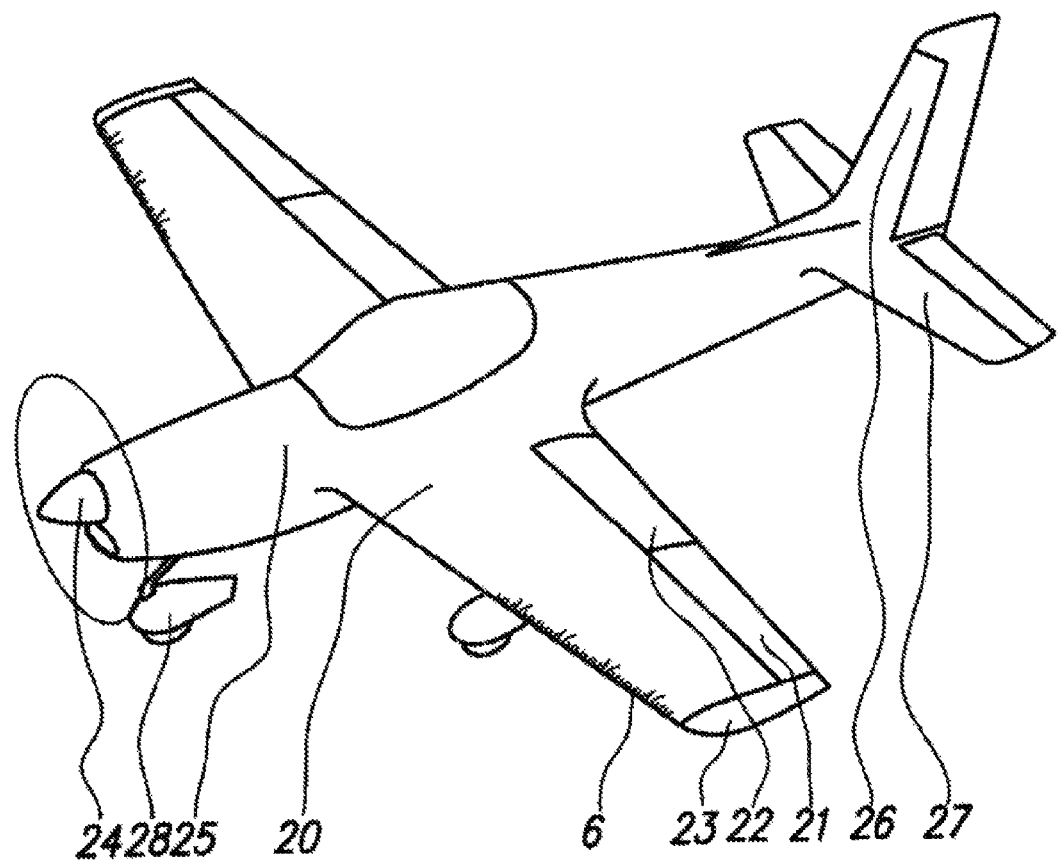
FIG. 30 represents an overall view of a light aircraft with the aerohydrodynamic surface according to the invention.

The operation of the aerohydrodynamic surface with respect to the aircraft shown in FIG. 30 can be considered as applied to cases of an aircraft behaviour with an unintentional loss of speed in a turning flight. When the speed drops in the turn, the aircraft, the wing consoles 20 of which are equipped with the groups of vortex generators according to the invention, has an increased level of safety, since a complete exit of the working edges 5 from the flow stagnation zone 49 occurs with a critical increase in the angle of attack and in the presence of a roll angle on the downward wing console 20 due to a significant displacement of the flow separation point 50 downward, which, in combination with the presence of a dynamic compression of the boundary layer in the zone of the leading edge 3, even if there is a separation zone of the boundary layer in the rear of the upper side 1 near the tip 23, excludes the instantaneous propagation of the separation zone of the boundary layer to the most important section of the upper side 1 from the point of view of maintaining the lifting characteristics, the section being adjacent to the leading edge 3, as it is shown in FIG. 10.

As a result, the aircraft does not stall onto the wing or it develops so smoothly that the angular acceleration of the emerging "stall" roll does not exceed the values that make it difficult for the pilot to adequately respond to the development of the stall.

Furthermore, the probability of an aircraft accidentally entering a spin from a turning flight is also reduced due to a significant improvement in the directional stability of the aircraft at high angles of attack as a consequence of "venting" the boundary layer near the leading edge, as it is shown in FIG. 17.

Figure 33:
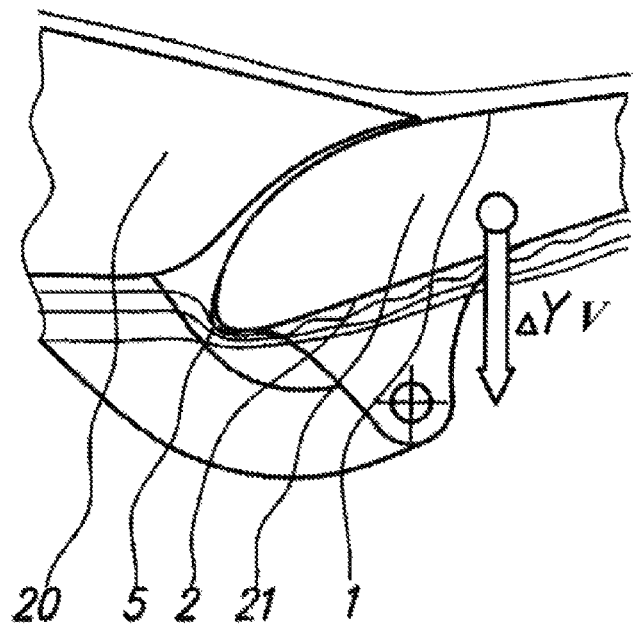
FIG. 33 shows a diagram of a flow around the rear of a wing of an aircraft with a slotted aileron on which the vortex generators according to the invention are mounted with the raised position of the slotted aileron.

The operation of the slotted aileron 21 designed with the aerodynamic surface according to the invention (FIGS. 33 and 34) is characterized by the following features:

1. An increase in the rolling-moment coefficient (Cmx) at low angles of attack mainly due to the creation of additional vacuum on the lower surface 2 of the raised slotted aileron 21 (FIG. 33) while simultaneously reducing the harmful yawing moment due to additional drag created by the edges 5 protruding beyond the dimensions of the lower side 2 of the wing console 20.

Figure 15:
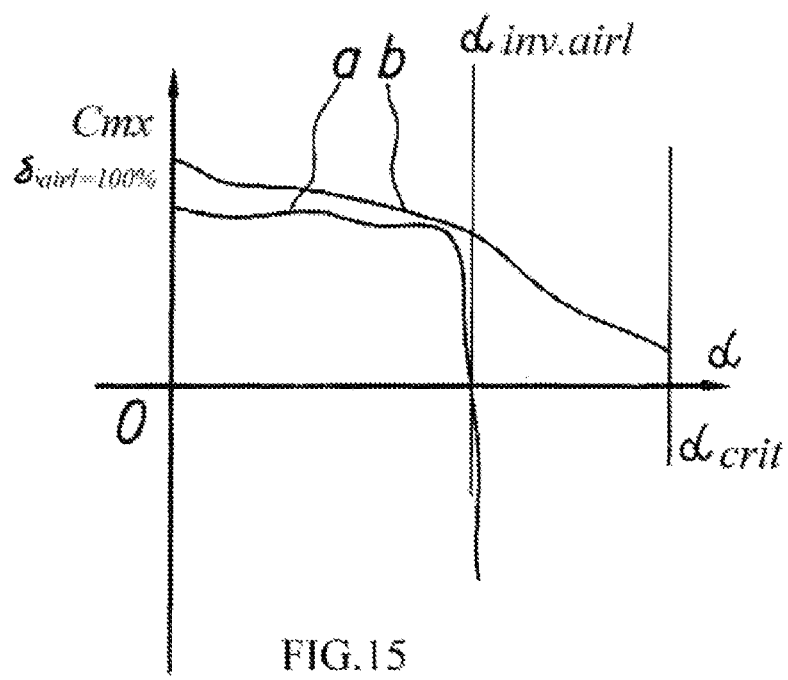
FIG. 15 represents simplified graphs of the dependence of a rolling-moment coefficient on an angle of attack on the known slotted aileron and on the aileron according to the invention.
Figure 16:
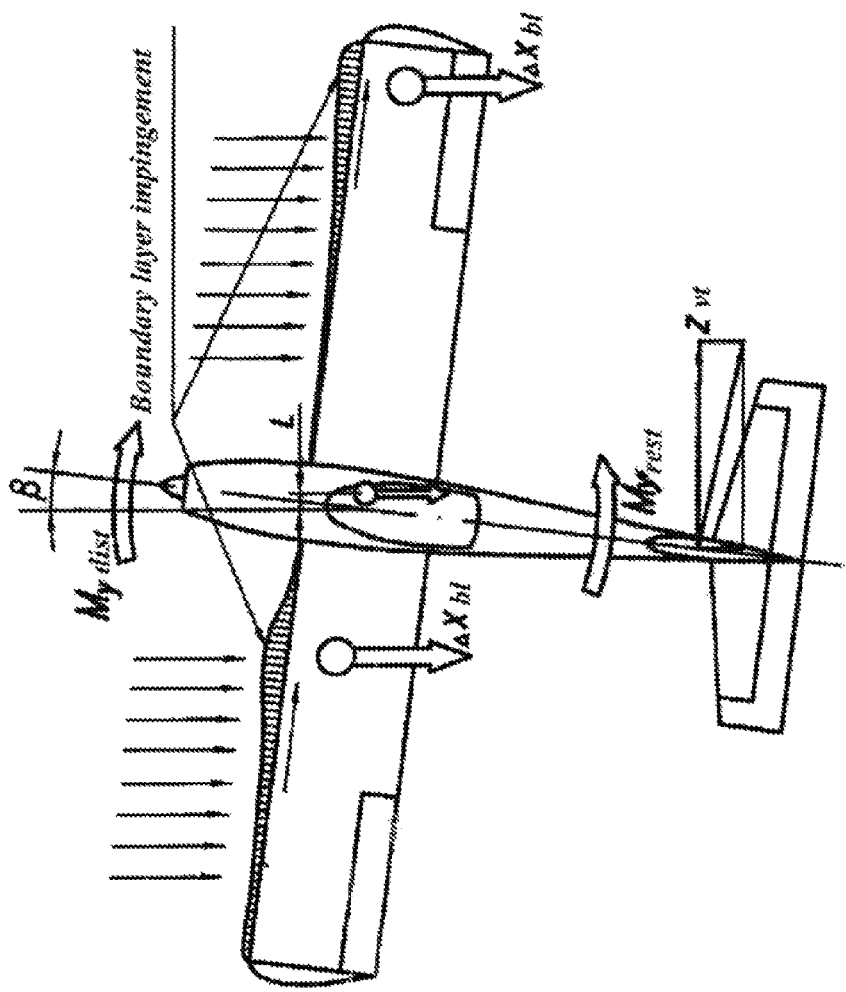
FIG. 16 represents a scheme of formation of the disturbing yawing moment due to a transverse flow of the boundary layer.
Figure 34:
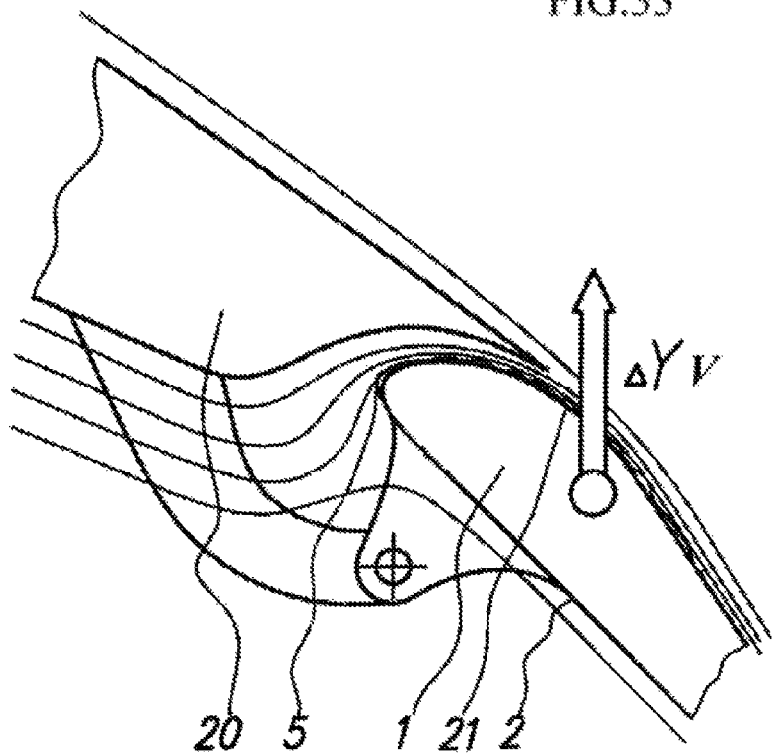
FIG. 34 illustrates the same but with the lowered position of the slotted aileron.

2. A decrease in the probability of occurrence of stalling aileron inversion shown as the curve b in FIG. 15, which is also primarily associated with the increase in the rolling-moment Cmx component created by the raised slotted aileron 21 as well as with a slight increase in the boundary layer energy on the upper side 1 of the lowered slotted aileron 21 (FIG. 34). It should be noted at the same time that the probability of occurrence of a stalling aileron inversion also largely depends on many other factors such as a wing tip design, a position of the wing relative to the centre of mass, its profile, a planform contour, and an aspect ratio.

This effect is especially valuable from the point of view of ensuring the flight safety of small aircrafts. In particular, the analysis of video materials, which recorded the moment of loss of lateral control of such aircrafts, shows that the catastrophic development of events in more than a half of the cases begins at the initial moment of pulling the aircraft out of roll or, on the contrary, at the initial moment of the creation of the roll required for the turn.

Furthermore, it is also possible to use the array of vortex generators corresponding to FIG. 21 on aircrafts designed to perform aerial stunts for the implementation of fine tuning of the stall characteristics of the aircraft and its behaviour on "stalling" stunts for a particular pilot to achieve the most spectacular and error-free aerobatics. At the same time, the control of the stall characteristics of the wing console is based on the chord and sweep control of the reverse flow zone.

The operation of the aerohydrodynamic surface shown in FIGS. 26, 27 as well as 28 and 29 fully corresponds to the operation of the aerohydrodynamic surface shown in FIG. 2 and the cumulative technical result is a combination of "cleanliness" of the shape of the aerohydrodynamic surface near the leading edge 3 with the simplicity and manufacturability of aerodynamic surfaces.

The operation of the aerohydrodynamic surface shown in FIGS. 35 and 36 occurs as follows: Forward of the beam, the fore-and-aft sail 35 operates at low angles of attack up to 5° and the working edges 5 are partially located in the flow stagnation zone. The lift over drag ratio of the fore-and-aft sail 35 at low angles of attack almost does not deteriorate due to the parasitic vortex generation and the tack angle does not significantly increase. When the yacht rolls into the wind, the angle of attack of the oblique sail 35 that is the most advantageous in terms of the sailing rate increases and the working edges 5 are in the optimal position and leave the stagnation flow zone due to the rotation of the all-movable mast 34 at an angle φ relative to the boom 41 due to the bend of the fore-and-aft sail 35, increasing the possible pressure difference between the windward and leeward sides of the fore-and-aft sail 35 by delaying the process of development of vortex currents on the windward side of the fore-and-aft sail 35, which increases the thrust force developed by the rig.

Thus, the active involvement of the working edges 5 in the operation provides the possibility of the vessel developing maximum sailing rate with wind abeam as well as on steep and full backstays.

Figure 37:
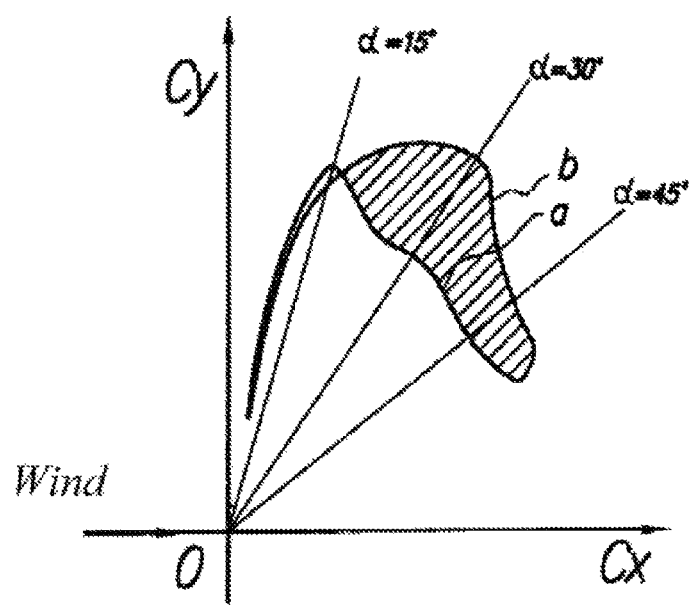
FIG. 37 represents simplified polars of the known rig and the rig with the vortex generators according to the invention.
Figure 38:
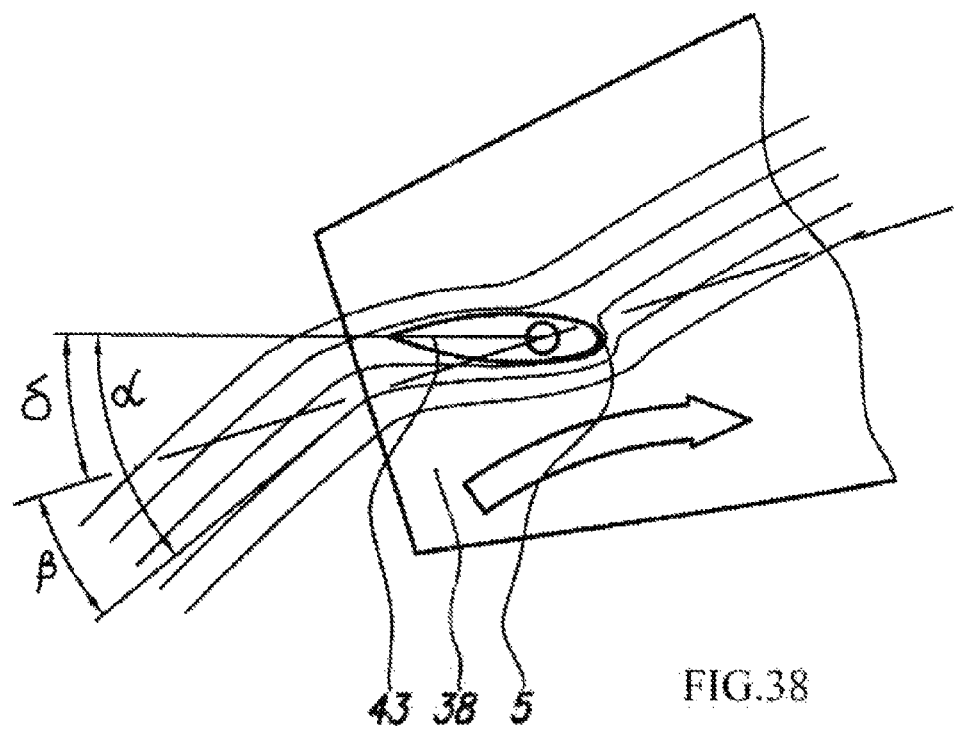
FIG. 38 is a scheme of increasing an angle of attack of a rudder blade with the vortex generators according to the invention with a sharp change in heading the vessel.

It is important to note that the use of the described array of vortex generators provides the fore-and-aft sail 35, in the presence of an aspect ratio of about 5, with the level of thrust while sailing free, the level being characteristic of fore-and-aft sails with half the aspect ratio, while maintaining the maximum efficiency forward of the beam, that is, the rig of a racing yacht becomes more "elastic" in terms of an off-bow angle, as it is shown in the polar diagram according to FIG. 37. At the same time, the increase in the efficiency of the rig while sailing free, which is characterized by the largest angles of attack α, is shown by the curve b in FIG. 37, with the curve a corresponding to the known rig.

The operation of the array of vortex generators configured to be mounted on the aerohydrodynamic surface does not differ from the operation of the above-described embodiments of the aerohydrodynamic surface in any way from the point of view of aerohydrodynamics.

In the first case, the vortex generators are made in the form of the set consisting of the two types of overlays shown in FIGS. 40 and 41 and comprising the base 18 with the bearing surface 19, the base developing into the strake 6.

The main technical result achieved in this embodiment of the invention is the maximum ease of mounting the array of vortex generators onto operating aircrafts, sailing ships and wind turbines, since the mounting of the vortex generators does not require any modification of the original aerodynamic surface, furthermore, with a paired mounting of the vortex generators, the ratio of distances between the strakes 6 in one pair and a distance between adjacent pairs of the strakes 6 can be easily selected for a given aerodynamic surface.

Moreover, the opposite twisting direction of the bearing surface 19 of the two types of overlays simplifies the mounting of the vortex generators, since the incorrect mounting becomes difficult due to the lack of interchangeability of the vortex generators configured to generate vortex structures of left or right rotation.

The technical result achieved in implementing the array of vortex generators with the overlays shown in FIG. 43 consists in the reliability of fastening the array of vortex generators onto small-sized aerohydrodynamic surfaces due to the sufficient strength of the overlay and the area of the bearing surface 19.

The technical result achieved in implementing the array of vortex generators with the overlays shown in FIG. 44 lies in the greater efficiency of the array of vortex generators with the overlays shown in FIG. 43 at negative angles of attack.

The technical result achieved in implementing the array of vortex generators with the overlays shown in FIG. 39 consists in a larger area of adhesion of the bearing surface 18 to the aerodynamic surface, which can be important when mounting the vortex generators onto the aerodynamic surfaces with a small radius of bluntness of the leading edge or operating at large values of the impact air pressure. At the same time, the narrowing 44 of the base 18 further reduces the parasitic vortex generation at low angles of attack.

Thus, the implementation of the invention allows achieving the following technical results:

As applied to the wing of an aircraft or a glider, the main technical result is the expanded range of flight speeds and the reduced minimum power required for a flight as well as the reduced stall speed, minimum maneuvering and landing speeds due to an increase in Cy and the "elasticity" in terms of K.

Furthermore, the technical result, depending on the stall characteristics of the original wing, consists in a significant decrease in the angular acceleration of roll when stalling onto the wing, including with an overload of more than 1 in a turning flight, as well as in the simplified pull-out of a spin or the completely eliminated entrance into the spin depending on the design of the wing by slowing down the forward movement of the boundary layer separation point, which improves the longitudinal and lateral stability of aircrafts and gliders.

Moreover, the technical result consists in stabilizing the position of the centre of pressure in the process of increasing the angle of attack of the wing, which expands the field of practical application of high-torque aerodynamic profiles, which, as a rule, have outstanding lifting characteristics.

With respect to the slotted or outboard ailerons (flaperons), the technical result consists in an increase in the rolling-moment coefficient with an increase in the fraction of the moment created by the raised aileron, which improves the lateral handling of the aircraft at low flight speeds as well as (in the case of synchronous downward deflection of the flaperons) in a decrease in the minimum maneuvering and landing speeds due to the increase in the increment of the peak value of Cy.

As applied to the horizontal tail, the technical result consists in the increased restoring pitching moment created by the horizontal tail at supercritical angles of attack, which reduces the probability of the aircraft accidentally entering a flat spin.

With respect to the all-movable horizontal tail, an additional technical result consists in the increased pitching-moment coefficient at significant angles of deviation from the neutral position.

As applied to the all-movable yacht masts, the main technical result lies in the increased thrust force of the fore-and-aft sail of a high aspect ratio while sailing free and in gusty winds. Furthermore, the technical result consists in the simplified control of the rig due to the delay in the development of the sail shivering.

With respect to the propellers, the technical result consists in the increased resistance of the propeller to stalling in the root part of the blade, which may be relevant for the main and antitorque rotor propellers of the helicopter.

As applied to the rudder blade, the technical result lies in the improved controllability of the vessel at low speed as well as in the increased effective rudder displacement angle.

With respect to the wind generators, the technical result lies in an increased efficiency of the plant and in a better response of the wind generator to a weak gusty wind, in which the blades with a "clean" leading edge periodically stall, which creates significant fluctuations in the torque and reduces the electric power generation.

The cumulative technical result is a significant improvement in the properties of the aerohydrodynamic surfaces at high angles of attack with a minimum increase in the profile drag at low angles of attack as well as with a low cost and ease of modification of various types of aerohydrodynamic surfaces in operation.

The invention claimed is:

1. An aerohydrodynamic surface, including an array of vortex generators and a main part, wherein
   the main part comprises two sides mating with each other to form a leading and a trailing edge and is also formed longitudinally by at least one streamlined profile at least in the front part,
   the array of vortex generators includes elevations with crescent-shaped working edges located near the leading edge so as to be fully or partially located in the flow stagnation zone at a given angle of attack and to exit from the flow stagnation zone when the angle of attack changes relative to the given one, and the frontal projections of the working edges are fully or partially located at an angle of 60 to 80° to the frontal projection of the leading edge and intersect the frontal projection of the leading edge so as to generate attached vortex structures and to increase the boundary layer energy on one of the sides of the aerohydrodynamic surface,
characterized in that
   the elevations and the working edges are configured to generate counter-rotating vortex structures, wherein
   the ratio of the distance between the midpoints of the frontal projections to the height of the frontal projections is from 0.5 to 1.5 and the tangents to the midpoints of the frontal projections are located at an angle of 20 to 60° to each other for two working edges configured to generate counter-rotating vortex structures.

2. The aerohydrodynamic surface according to claim 1, characterized in that
   the elevations are made in the form of strakes of a flat or triangular cross-section, the strakes enveloping the leading edge and having a crescent shape, wherein
   the working edges are formed by the outer edges of the strakes.

3. The aerohydrodynamic surface according to claim 2, characterized in that
   the surface further comprises a leading-edge skin and a core 10,
   the array of vortex generators is made in the form of plates with holes,
   the leading-edge skin is made of a sheet material,
   the core is made of a foamed polymer material and is glued to the leading-edge skin with an adhesive composition,
   the leading-edge skin and the core are made with slots, wherein the slots of the core are in communication with the slots of the leading-edge skin, and
   the plates are mounted in the slots and are fixed with the adhesive composition, wherein
   the outer parts of the plates protruding beyond the dimensions of the leading-edge skin form the strakes and the holes of the plates are configured to be filled with the adhesive composition.

4. The aerohydrodynamic surface according to claim 2, characterized by comprising:
   a two-layer leading-edge skin consisting of an outer layer and an inner layer, wherein the outer layer is made with a group of cut-outs,
   the array of vortex generators is made in the form of a set of overlays, each overlay including a base developing into one or two strakes,
   the bases of the overlays are received in the cut-outs of the outer layer so as to be able to reduce the aerodynamic drag, and
   the thickness of the outer layer is greater than or equal to the thickness of the overlay bases.

5. The aerohydrodynamic surface according to claim 1, characterized in that
   the elevations are made in the form of a group of protrusions, wherein
   the projection of the leading edge of the aerohydrodynamic surface onto the plane of the chords is crank-shaped,
   the frontal projections of the protrusions have a trapezoidal shape,
   each of the protrusions is formed by a front and two side surfaces, and
   the working edges of the protrusion are formed by mating the front and side surfaces of the protrusions and are configured to generate counter-rotating vortex structures.

6. The aerohydrodynamic surface according to claim 1, characterized in that
   the elevations are made in the form of conjunctions of saddle-shaped surfaces mating with each other and smoothly developing to both sides of the aerohydrodynamic surface, wherein
   the saddle-shaped surfaces have a negative curvature,
   the edges of the saddle-shaped surface at the sites of mating with the adjacent saddle-shaped surfaces form working edges configured to generate counter-rotating vortex structures, and the projection of the leading edge onto the plane of the chords is a combination of arcs of a constant or variable radius that are mating with each other.

7. The aerohydrodynamic surface according to claim 1, characterized in that
the surface is designed with an asymmetrical streamlined profile, wherein
the elevations are made in the form of combination of conjunctions of the saddle-shaped surfaces with strakes, wherein
the strakes are located on the side of the aerohydrodynamic surface having a larger curvature and smoothly mate with the ledges or conjunctions of the saddle-shaped surfaces, and
the working edges smoothly pass from the ledges or conjunctions of concave surfaces to the strakes.

8. The aerohydrodynamic surface according to claim 1, characterized in that
the working edges are additionally bent so that their frontal projections are S-shaped, wherein
the tangents to the ends of the frontal projections of the adjacent working edges are located at an angle of no more than 10° to each other so as to be able to reduce the power of parasitic vortex generation.

9. The aerohydrodynamic surface according to claim 1, characterized in that
the surface is fully or partially designed with a symmetrical streamlined profile, wherein
the lateral projections of the working edges are symmetrical relative to the midline of the streamlined profile, and
two adjacent distances between the points of intersection of the frontal projections of the adjacent working edges with the frontal projection of the leading edge differ from each other by no more than 10% so as to be able to equalize the characteristics of the aerohydrodynamic surface at positive and negative angles of attack.

10. The aerohydrodynamic surface according to claim 9, characterized in that
the surface is formed longitudinally by a combination of profiled and membrane sections, wherein
the profiled section is made in the form of an all-movable mast,
the membrane section is made in the form of a fore-and-aft sail mounted on the trailing edge of the all-movable mast, wherein
the aerohydrodynamic surface is configured to turn the profiled section relative to the chord when the membrane section is bent under the action of a wind force.

11. An array of vortex generators for mounting onto the aerohydrodynamic surface according to claim 10, the array being made in the form of a set of overlays, each overlay including a base with a bearing surface and at least one elevation with at least one working edge, wherein two sides mating with each other form a leading and a trailing edge, characterized in that the minimum radius of curvature of the bearing surface of the overlay is from 90 to 110% of the minimum radius of bluntness of the leading edge radius of the aerohydrodynamic surface.

12. The array of vortex generators according to claim 11, characterized in that each of the overlays is designed with one strake developing into the base, the array of vortex generators comprises two types of overlays, the bases of the overlays are made with clockwise or counter-clockwise twisting, and the two types of the overlays have the opposite twisting direction of the base.

13. The array of vortex generators according to claim 11, characterized in that each of the overlays is designed with two strakes mounted on the base, wherein the base is made with a narrowing in the middle part, and the outer edges of the strakes form paired working edges.

14. The array of vortex generators according to claim 11, characterized in that each of the overlays is made in the form of a base having a trapezoidal shape and configured to form elevations in the form of protrusions, the base being formed by a front, two side surfaces and a bearing surface, wherein paired working edges are formed by mating the front surface with the side surfaces of the base.

15. The array of vortex generators according to claim 14, characterized in that the front surface of the base includes a saddle-shaped surface of a negative curvature that is adjacent to the working edges.

16. The array of vortex generators according to claim 11, characterized in that each of the overlays is made in the form of a boot including at least two pairs of working edges.

17. The array of vortex generators according to claim 11, characterized in that each of the overlays is designed with at least one transverse slot configured to improve the fit of the overlay to the aerohydrodynamic surface.

18. The aerohydrodynamic surface according to claim 1, characterized in that
the array of vortex generators includes elevations forming working edges of at least two standard sizes,
the working edges are arranged in pairs,
each of the pairs of working edges is configured to generate counter-rotating vortex structures, and
at least one pair of working edges of a larger standard size that is configured to equalize the boundary layer energy along the chord and span of one of the sides of the aerohydrodynamic surface is located between two pairs of working edges of a smaller standard size.

19. The aerohydrodynamic surface according to claim 18, characterized in that
the surface is formed longitudinally by at least one asymmetrical streamlined profile,
the frontal projections of the working edges of the larger and smaller standard sizes are offset relative to each other, wherein
the midpoints of the frontal projections of the working edges of the strakes of the larger standard size are offset in the bending direction of the midline of the streamlined profile relative to the midpoints of the frontal projections of the working edges of the smaller standard size.

20. A method of mounting an array of vortex generators made in the form of a set of overlays onto an aerohydrodynamic surface, the method comprising the following steps: placing the overlays onto the aerohydrodynamic surface near a leading edge in such a way that adjacent working edges are located at an angle of 20 to 60 degrees relative to each other so as to be able to generate counter-rotating vortex structures; and attaching the overlays to the aerohydrodynamic surface using an adhesive composition, characterized in that the overlays are mounted in such a way that the frontal projections of the working edges of the overlays intersect the frontal projection of the leading edge of the aerohydrodynamic surface, wherein the ratio of the distance between the midpoints of the frontal projections to the height of the frontal projections is from 0.5 to 1.5 for two working edges configured to generate counter-rotating vortex structures.

* * * * *